United States Patent
Liu

(10) Patent No.: US 11,525,883 B2
(45) Date of Patent: Dec. 13, 2022

(54) ACQUISITION EQUIPMENT, SOUND ACQUISITION METHOD, AND SOUND SOURCE TRACKING SYSTEM AND METHOD

(71) Applicant: BOE TECHNOLOGY GROUP CO., LTD., Beijing (CN)

(72) Inventor: Cheng Liu, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 793 days.

(21) Appl. No.: 16/337,039

(22) PCT Filed: Oct. 8, 2018

(86) PCT No.: PCT/CN2018/109348
§ 371 (c)(1),
(2) Date: Mar. 27, 2019

(87) PCT Pub. No.: WO2019/080705
PCT Pub. Date: May 2, 2019

(65) Prior Publication Data
US 2021/0349178 A1    Nov. 11, 2021

(30) Foreign Application Priority Data
Oct. 23, 2017    (CN) .......................... 201710994756.6

(51) Int. Cl.
*G01S 5/20* (2006.01)
*G06T 7/73* (2017.01)
(Continued)

(52) U.S. Cl.
CPC .............. *G01S 5/20* (2013.01); *G01B 11/002* (2013.01); *G06T 7/74* (2017.01); *H04S 7/303* (2013.01); *G06T 2207/30244* (2013.01)

(58) Field of Classification Search
CPC .......... G01S 5/20; G01S 3/7864; H04S 7/303; G01B 11/002; G06T 7/74;
(Continued)

(56) References Cited

U.S. PATENT DOCUMENTS

| 5,940,118 A | 8/1999 | Van Schyndel |
| 6,005,610 A * | 12/1999 | Pingali .................... G01S 3/808 |
| | | 348/14.16 |

(Continued)

FOREIGN PATENT DOCUMENTS

| CN | 101484933 A | 7/2009 |
| CN | 101548547 A | 9/2009 |

(Continued)

OTHER PUBLICATIONS

Extended European Search Report in European Application No. 18859944.3 dated Jul. 8, 2021.

(Continued)

*Primary Examiner* — Marnie A Matt
(74) *Attorney, Agent, or Firm* — Collard & Roe, P.C.

(57) ABSTRACT

An acquisition equipment, a sound acquisition method, a sound source tracking system and a sound source tracking method are provided. The acquisition equipment includes an audio acquisition device, an image acquisition device, an information processing device and an angle control device. The audio acquisition device is configured to acquire the sound of a target object; the image acquisition device is configured to acquire an optical image including an acquisition object; the information processing device is configured to process the optical image to determine position information of the target object; and the angle control device is configured to receive the position information of the target object sent by the information processing device, and con- (Continued)

trol the sound pick-up angle of the audio acquisition device according to the position information of the target object.

13 Claims, 9 Drawing Sheets

(51) Int. Cl.
  *G01B 11/00* (2006.01)
  *H04S 7/00* (2006.01)
(58) Field of Classification Search
  CPC ........ G06T 2207/30244; G06T 19/006; H04R 1/406; H04R 2201/401; H04R 1/028; H04R 2430/25; H04N 2005/2255; H04N 9/806; H04N 5/23206
  USPC ........................................................ 348/169
  See application file for complete search history.

(56) References Cited

U.S. PATENT DOCUMENTS

| | | | |
|---|---|---|---|
| 7,035,418 | B1 | 4/2006 | Okuno et al. |
| 8,761,412 | B2 | 6/2014 | Hernandez-Abrego et al. |
| 8,781,151 | B2 | 7/2014 | Marks et al. |
| 10,535,153 | B2 | 1/2020 | Weising et al. |
| 2007/0025562 | A1 | 2/2007 | Zalewski et al. |
| 2007/0260340 | A1 | 11/2007 | Mao |
| 2012/0155703 | A1 | 6/2012 | Hernandez-Abrego et al. |
| 2015/0022636 | A1 | 1/2015 | Savransky |
| 2015/0088500 | A1 | 3/2015 | Conliffe |
| 2015/0341734 | A1* | 11/2015 | Sherman ................ H04R 1/406 381/92 |
| 2016/0150207 | A1 | 5/2016 | Zheng |
| 2016/0225164 | A1* | 8/2016 | Tomlin ..................... G06T 7/40 |
| 2018/0035235 | A1* | 2/2018 | Funakoshi ............. H04S 7/304 |

FOREIGN PATENT DOCUMENTS

| | | | |
|---|---|---|---|
| CN | 102223594 | A | 10/2011 |
| CN | 103404169 | A | 11/2013 |
| CN | 103581606 | A | 2/2014 |
| CN | 104049721 | A | 9/2014 |
| CN | 104133550 | A | 11/2014 |
| CN | 104202694 | A | 12/2014 |
| CN | 104238924 | A | 12/2014 |
| CN | 104391580 | A | 3/2015 |
| CN | 105451139 | A | 3/2016 |
| CN | 105979126 | A | 9/2016 |
| CN | 106341665 | A | 1/2017 |
| CN | 106782584 | A | 5/2017 |
| CN | 107123423 | A | 9/2017 |
| JP | WO 2014/125835 A1 * | 8/2014 | ......... H04N 5/23206 |
| WO | 0077537 A1 | 12/2000 | |

OTHER PUBLICATIONS http://www.sohu.com/a/78211283_114877, "HTC vive, Oculus rift, PS VR, how do the three heads are positioned?", May 28, 2016 with English translation (10 pages).
http://doc-ok.org/?p=1095, "Hacking the Oculus Rift DK2", Doc-Ok.org A developer's perspective on immersive 3D computer graphics, Oct. 5, 2014 (21 pages).
http://doc-ok.org/?p=1124, "Hacking the Oculus Rift DK2, part II", Doc-Ok.org A developer's perspective on immersive 3D computer graphics, Oct. 11, 2014 (12 pages).
http://doc-ok.org/?p=1138, "Hacking the Oculus Rift DK2, part III", Doc-Ok.org A developer's perspective on immersive 3D computer graphics, Oct. 14, 2014 (14 pages).
http://doc-ok.org/?p=1148, "Hacking the Oculus Rift DK2, part IV", Doc-Ok.org A developer's perspective on immersive 3D computer graphics, Oct. 16, 2014 (2 pages).
International Search Report of PCT/CN2018/109348 in Chinese, dated Jan. 4, 2019, with English translation.
Notice of Transmittal of the International Search Report of PCT/CN2018/109348 in Chinese, dated Jan. 4, 2019.
Written Opinion of the International Searching Authority of PCT/CN2018/109348 in Chinese, dated Jan. 4, 2019 with English translation.
Virtual Reality VRML programming; compiled by Zhangyi, Zhanghongding, Cuixin; Nankai University Press; Jan. 2007 with English translation (4 pages).
Chinese Office Action in Chinese Application No. 201710994756.6, dated Apr. 14, 2020 with English translation.

* cited by examiner

ACQUISITION EQUIPMENT, SOUND ACQUISITION METHOD, AND SOUND SOURCE TRACKING SYSTEM AND METHOD

CROSS REFERENCE TO RELATED APPLICATION

This application is the National Stage of PCT/CN2018/109348 filed on Oct. 8, 2018, which claims priority under 35 U.S.C. § 119 of Chinese Application No. 201710994756.6 filed on Oct. 23, 2017, the disclosure of which is incorporated by reference.

TECHNICAL FIELD

Embodiments of the present disclosure relate to acquisition equipment, a sound acquisition method, a sound source tracking system and a sound source tracking method.

BACKGROUND

Sound localization technology is a technique for determining spatial location information of one or more sound sources. The sound localization technology has the characteristics of passive detection mode, non-contact measurement, no communication condition interference, strong concealment and no visibility limitation. Therefore, the sound localization technology can be widely used in medical research, traffic detection, video conference, military field, robot speech recognition and other fields.

SUMMARY

At least one embodiment of the disclosure provides an acquisition equipment, comprising: an audio acquisition device, an image acquisition device, an information processing device and an angle control device, wherein the audio acquisition device is configured to acquire sound of a target object; the image acquisition device is configured to acquire an optical image including an acquisition object; the information processing device is configured to process the optical image to determine position information of the target object; and the angle control device is configured to receive the position information of the target object sent by the information processing device, and control a sound pick-up angle of the audio acquisition device according to the position information of the target object.

For example, in the acquisition equipment according to an embodiment of the disclosure, the image acquisition device and the audio acquisition device are integrated into a whole; the information processing device is also configured to determine image position information of the acquisition object in the optical image, and determine a horizontal azimuth of the acquisition object according to the image position information, in which the position information of the target object includes the horizontal azimuth of the acquisition object; and the angle control device is further configured to receive the horizontal azimuth of the acquisition object and control the sound pick-up angle of the audio acquisition device according to the horizontal azimuth of the acquisition object.

For example, in the acquisition equipment according to an embodiment of the disclosure, the information processing device is also configured to establish a camera coordinate system based on the image acquisition device, and establish an audio acquisition coordinate system based on the audio acquisition device, determine camera position information of the acquisition object in the camera coordinate system, transform the camera position information of the acquisition object into audio acquisition position information in the audio acquisition coordinate system, and determine an azimuth of the acquisition object in the audio acquisition coordinate system according to the audio acquisition position information, in which the position information of the target object includes the azimuth of the acquisition object; and the angle control device is further configured to receive the azimuth of the acquisition object and control the sound pick-up angle of the audio acquisition device according to the azimuth of the acquisition object.

For example, in the acquisition equipment according to an embodiment of the disclosure, the target object includes a sound source; the image acquisition device and the audio acquisition device are integrated into a whole; the information processing device is further configured to determine image position information of the acquisition object in the optical image, determine first image relative position information between the acquisition object and the sound source, and determine a horizontal azimuth of the sound source according to the image position information of the acquisition object and the first image relative position information, in which the position information of the target object includes the horizontal azimuth of the sound source; and the angle control device is further configured to receive the horizontal azimuth of the sound source and control the sound pick-up angle of the audio acquisition device according to the horizontal azimuth of the sound source.

For example, in the acquisition equipment according to an embodiment of the disclosure, the information processing device is further configured to determine image reference position information of the acquisition object in the optical image, determine second image relative position information between the image position information and the image reference position information of the acquisition object in the optical image, acquire third image relative position information between the sound source and the image reference position information, and determine the first image relative position information according to the third image relative position information and the second image relative position information.

For example, in the acquisition equipment according to an embodiment of the disclosure, the target object includes a sound source; the information processing device is further configured to establish a camera coordinate system based on the image acquisition device, establish an audio acquisition coordinate system based on the audio acquisition device, determine camera position information of the acquisition object in the camera coordinate system, determine first camera relative position information between the acquisition object and the sound source in the camera coordinate system, determine camera sound source position information of the sound source in the camera coordinate system according to the camera position information of the acquisition object and the first camera relative position information, transform the camera sound source position information into audio acquisition sound source position information in the audio acquisition coordinate system, and determine an azimuth of the sound source in the audio acquisition coordinate system according to the audio acquisition sound source position information, in which the position information of the target object includes the azimuth of the sound source; and the angle control device is further configured to receive the azimuth of the sound source and control the sound pick-up angle of the audio acquisition device according to the azimuth of the sound source.

For example, in the acquisition equipment according to an embodiment of the disclosure, the information processing device is further configured to determine camera reference position information of the acquisition object in the camera coordinate system, determine second camera relative position information between the camera position information and the camera reference position information of the acquisition object in the camera coordinate system, acquire third camera relative position information between the sound source and the camera reference position information, and determine first camera relative position information according to the third camera relative position information and the second camera relative position information.

At least one embodiment of the disclosure provides a sound source tracking system, comprising: the acquisition object and the acquisition equipment according to any one of the above items, the acquisition object including a luminous element, wherein the luminous element is configured to emit light when the acquisition object is in a tracking area of the acquisition equipment; and the angle control device of the acquisition equipment is further configured to control the sound pick-up angle of the audio acquisition device according to the position information of the target object so as to track the target object.

For example, in the sound source tracking system according to an embodiment of the disclosure, the image acquisition device is configured to acquire the optical image of the tracking area of the acquisition equipment when the acquisition object is in the tracking area of the acquisition equipment.

For example, in the sound source tracking system according to an embodiment of the disclosure, the acquisition object further includes a controller and an inertial measurement unit; the inertial measurement unit is configured to detect motion information of the acquisition object; and the controller or the information processing device is configured to establish a camera coordinate system based on the image acquisition device, acquire type information of the acquisition object, acquire the motion information of the acquisition object, and determine camera reference position information of the acquisition object in the camera coordinate system or determine image reference position information of the acquisition object in the optical image according to the motion information of the acquisition object and the type information of the acquisition object.

For example, the sound source tracking system according to an embodiment of the disclosure comprises a plurality of acquisition objects; and luminous parameters of the luminous elements in the plurality of acquisition objects have different change modes.

At least one embodiment of the disclosure provides a sound acquisition method, comprising: acquiring an optical image of an acquisition object; processing the optical image to determine position information of a target object; controlling a sound pick-up angle of an audio acquisition device of an acquisition equipment according to the position information of the target object; and acquiring sound of the target object through the audio acquisition device.

For example, in the sound acquisition method according to an embodiment of the disclosure, the acquisition equipment further includes an image acquisition device; the image acquisition device is configured to acquire the optical image; the image acquisition device and the audio acquisition device are integrated into a whole; processing the optical image to determine the position information of the target object includes: determining image position information of the acquisition object in the optical image, and determining a horizontal azimuth of the acquisition object according to the image position information, in which the position information of the target object includes the horizontal azimuth of the acquisition object; and controlling the sound pick-up angle of the audio acquisition device of the acquisition equipment according to the position information of the target object includes: controlling the sound pick-up angle of the audio acquisition device according to the horizontal azimuth of the acquisition object.

For example, in the sound acquisition method according to an embodiment of the disclosure, the acquisition equipment further includes an image acquisition device, the image acquisition device is configured to acquire the optical image; processing the optical image to determine the position information of the target object includes: establishing a camera coordinate system based on the image acquisition device, establishing an audio acquisition coordinate system based on the audio acquisition device, determining camera position information of the acquisition object in the camera coordinate system, transforming the camera position information of the acquisition object into audio acquisition position information in the audio acquisition coordinate system, and determining an azimuth of the acquisition object in the audio acquisition coordinate system according to the audio acquisition position information, in which the position information of the target object includes the azimuth of the acquisition object; and controlling the sound pick-up angle of the audio acquisition device of the acquisition equipment according to the position information of the target object includes: controlling the sound pick-up angle of the audio acquisition device according to the azimuth of the acquisition object.

For example, in the sound acquisition method according to an embodiment of the disclosure, the acquisition equipment further includes an image acquisition device, the image acquisition device is configured to acquire the optical image, the target object includes a sound source, the image acquisition device and the audio acquisition device are integrated into a whole; processing the optical image to determine the position information of the target object includes: determine an image position information of the acquisition object in the optical image, determine first image relative position information between the acquisition object and the sound source in the optical image, and determine a horizontal azimuth of the sound source according to the image position information of the acquisition object and the first image relative position information, in which the position information of the target object includes the horizontal azimuth of the sound source; and controlling the sound pick-up angle of the audio acquisition device of the acquisition equipment according to the position information of the target object includes: controlling the sound pick-up angle of the audio acquisition device according to the horizontal azimuth of the sound source.

For example, in the sound acquisition method according to an embodiment of the disclosure, determining the first image relative position information between the acquisition object and the sound source in the optical image includes: determining image reference position information of the acquisition object in the optical image; determining second image relative position information between the image position information and the image reference position information of the acquisition object in the optical image; acquiring third image relative position information between the sound source and the image reference position information; and determining the first image relative position information according to the third image relative position information and the second image relative position information.

For example, in the sound acquisition method according to an embodiment of the disclosure, the acquisition equipment further includes an image acquisition device, the image acquisition device is configured to acquire the optical image, the target object includes a sound source; processing the optical image to determine the position information of the target object includes establishing a camera coordinate system based on the image acquisition device, establishing an audio acquisition coordinate system based on the audio acquisition device, determining camera position information of the acquisition object in the camera coordinate system, determining first camera relative position information between the acquisition object and the sound source in the camera coordinate system, determining camera sound source position information of the sound source in the camera coordinate system according to the camera position information of the acquisition object and the first camera relative position information, transforming the camera sound source position information into audio acquisition sound source position information in the audio acquisition coordinate system, and determining an azimuth of the sound source in the audio acquisition coordinate system according to the audio acquisition sound source position information, in which the position information of the target object includes the azimuth of the sound source; and controlling the sound pick-up angle of the audio acquisition device of the acquisition equipment according to the position information of the target object includes: controlling the sound pick-up angle of the audio acquisition device according to the azimuth of the sound source.

For example, in the sound acquisition method according to an embodiment of the disclosure, determining the first camera relative position information between the acquisition object and the sound source in the camera coordinate system includes: determining camera reference position information of the acquisition object in the camera coordinate system; determining second camera relative position information between the camera position information and the camera reference position information of the acquisition object in the camera coordinate system; acquiring third camera relative position information between the sound source and the camera reference position information; and determining the first camera relative position information according to the third camera relative position information and the second camera relative position information.

At least one embodiment of the disclosure provides a sound source tracking method, comprising: controlling a luminous element of an acquisition object to emit light when determining that the acquisition object is in a tracking area of an acquisition equipment; acquiring an optical image including the acquisition object; processing the optical image to determine position information of a target object; and controlling a sound pick-up angle of the audio acquisition device of the acquisition equipment according to the position information of the target object so as to track the target object.

For example, in the sound source tracking method according to an embodiment of the disclosure, wherein the acquisition equipment includes an image acquisition device; the image acquisition device is configured to acquire the optical image; the acquisition object further includes an inertial measurement unit; the sound source tracking method further comprises: detecting motion information of the acquisition object through the inertial measurement unit; acquiring type information of the acquisition object; and determining camera reference position information of the acquisition object in the camera coordinate system or determining image reference position information of the acquisition object in the optical image, according to the motion information of the acquisition object and the type information of the acquisition object.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the invention.

DETAILED DESCRIPTION

Figure 1:
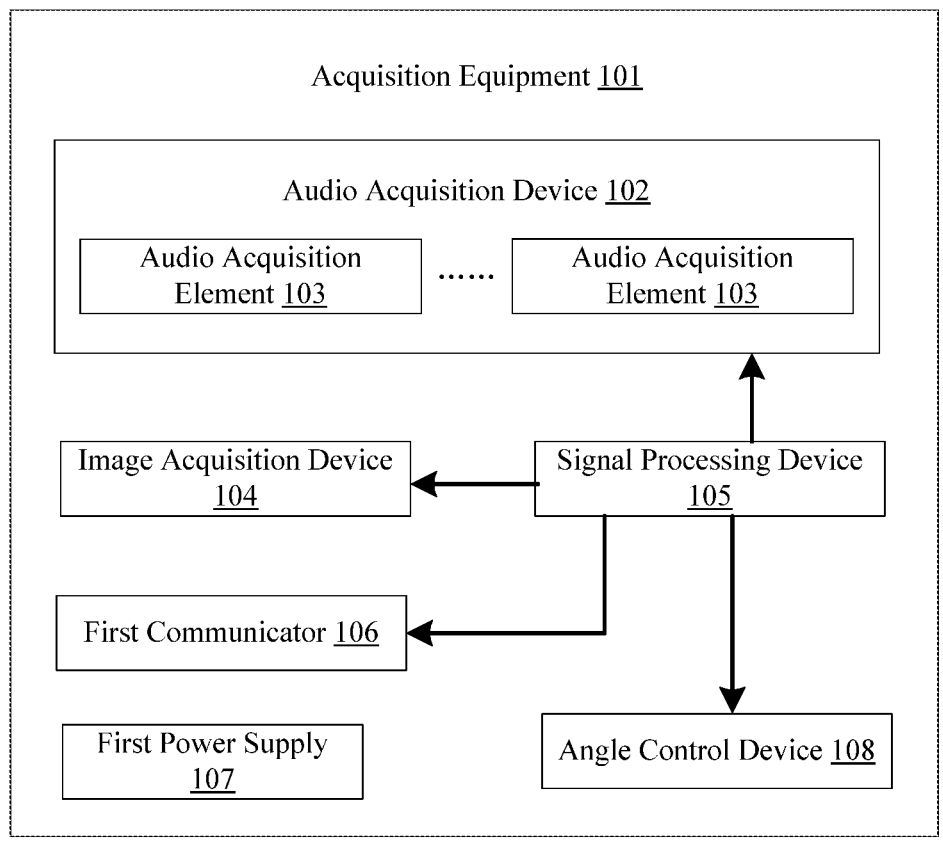
FIG. 1 is a schematic block diagram of acquisition equipment provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

In order to keep the following description of the embodiments of the present disclosure clear and concise, the detailed description on known functions and known components have been omitted in the present disclosure.

A microphone array includes a set of microphones arranged in a certain way. Voice signals can be picked up by utilization of the microphone array, and the picked voice signals can be analyzed and processed by utilization of digital signal processing technology, and then the sound source can be positioned. At the same time, the microphone array can align the sound pick-up angle to the azimuth of the sound source, suppress noise interference in other directions, and then realize sound source tracking. In some cases, although the microphone array can accurately control the sound pick-up angle, the positioning accuracy of the sound source is not high and the speed is slow. It is difficult to accurately and timely track the sound source only by the microphone array. In particular, when there are multiple sound sources in a tracking area of the microphone array, sound source tracking may fail.

Visual recognition tracking technology involves detecting the position of a specific object from a video and keeping track of the position. The visual recognition tracking technology can detect and track specific objects based on their own optical characteristics such as shape, color and infrared light. It is more difficult to detect and track a specific object by using visual recognition tracking technology when the recognition characteristics of the specific object are complex, or when the specific object is in motion or deformation (due to motion, posture change, occlusion, etc.).

At least one embodiment of the present disclosure provides an acquisition equipment, a sound acquisition method, a sound source tracking system and a sound source tracking method, which adopt the acquisition equipment to acquire and process an optical image to determine the position of an acquisition object, control an audio acquisition device for sound source tracking, can improve the accuracy and the efficiency of sound source tracking, reduce noise, and realize multi-sound-source recognition tracking.

It should be noted that in the following description of the present disclosure, "position information" may include one or more selected from the group consisting of azimuth, distance and position vector.

Detailed description will be given below to the embodiments of the present disclosure with reference to the accompanying drawings, but the present disclosure is not limited to these specific embodiments.

FIG. 1 is a schematic block diagram of an acquisition equipment provided by an embodiment of the present disclosure.

For instance, as shown in FIG. 1, the acquisition equipment 101 provided by the embodiment of the present disclosure may comprise an audio acquisition device 102, an information processing device 105, an image acquisition device 104 and an angle control device 108. The audio acquisition device 102 is configured to acquire the sound of a target object. The image acquisition device 104 is configured to acquire an optical image including an acquisition object. The information processing device 105 is configured to process the optical image so as to determine position information of the target object. The angle control device 108 is configured to receive the position information of the target object sent by the information processing device 105, and control the sound pick-up angle of the audio acquisition device 102 according to the position information of the target object.

For instance, the image acquisition device 104 is configured to acquire the optical image in a tracking area of the acquisition equipment 101.

For instance, the tracking area may include an image acquisition area of the image acquisition device 104.

For instance, the sound pick-up angle may be the sound source azimuth when the audio acquisition device 102 acquires the sound.

For instance, the audio acquisition device 102 may include a plurality of audio acquisition elements 103. FIG. 1 only shows two audio acquisition elements 103, but the present disclosure is not limited thereto. According to actual design demands, the audio acquisition device 102 may include a plurality of (e.g., three, four or five) audio acquisition elements 103. The audio acquisition device 102 may include a microphone array, namely the plurality of audio acquisition elements 103 form the microphone array. The arrangement mode of the plurality of audio acquisition elements 103 may be a straight line, a triangle, a ring, a cross, a sphere or a spiral shape. The straight line, for instance, may indicate that the plurality of audio acquisition elements 103 are arranged in one row or one column.

For instance, the audio acquisition elements 103 may be various types of microphones or other elements capable of acquiring the voice. The microphone may be an electret capacitor microphone, a micro-electronic mechanical system (MEMS) microphone, etc.

For instance, the target object may include a sound source. The audio acquisition element 103 may acquire sound information of the sound source. The information processing device 105 is also configured to process the sound information acquired by the audio acquisition elements 103.

For instance, the acquisition equipment 101 may include a main body casing.

For instance, the audio acquisition elements 103 may be disposed on a surface of the main body casing.

For instance, the image acquisition device 104 may include one or more cameras. The camera, for instance, may be a camera of a smart mobile phone, a camera of a tablet PC, a camera of a personal computer, or a network camera. In one example, the image acquisition device 104 may include one monocular camera, that is, the image acquisition device 104 includes one camera. The information processing device 105 may determine the azimuth of specific pixels or specific areas in the optical image relative to the image acquisition device 104 in the space based on the optical image acquired by the monocular camera. In another example, the image acquisition device 104 may include one or more multocular (e.g., binocular or trinocular) cameras, that is, the image acquisition device 104 includes a plurality of (e.g., two or three) cameras. The information processing device 105 may determine the azimuth and the distance of specific pixels or specific areas in the optical image relative to the image acquisition device 104 in the space based on the optical image acquired by the multocular camera.

For instance, the service band of the image acquisition device 104 may be visible band, infrared band, ultraviolet band or a combination thereof. The image acquisition device 104 can realize different service bands in combination of a plurality of optical filters and a plurality of cameras. For instance, the optical filters may include infrared filters, visible filters, etc. The infrared filter is configured to transmit infrared light, for instance, transmit infrared light with the wavelength of 0.85 μm-0.95 μm. The visible filter is configured to transmit visible light, for instance, transmit visible light with the wavelength of 0.63 μm-0.76 μm. The optical filter can be disposed on an image input terminal of the camera to transmit light with specific wavelength, so the optical image acquired by the camera can be an infrared image, a visible image, etc. That is, the service band of the image acquisition device 104 is infrared band, visible band, etc.

For instance, the camera in the image acquisition device 104 may have one or more functions of rotation, zooming and auto-focusing, so the image acquisition device 104 can track an object in the tracking area of the acquisition equipment 101.

For instance, the coverage range of the sound pick-up angle of the audio acquisition device 102 may include the tracking area of the acquisition equipment 101, so the audio acquisition device 102 can track an object at any position of the tracking area of the acquisition equipment 101.

For instance, the image acquisition device 104 may be disposed on a surface or the outside of the main body casing, faces the tracking area of the acquisition equipment 101, and can acquire the optical image in the tracking area.

It should be noted that the audio acquisition device 102 and the image acquisition device 104 may be close to each other.

For instance, the information processing device 105 may be a processing device having data processing capability and/or program execution capability. The information processing device 105 includes but not limited to one or more of elements such as a processor, a Single-Chip Microcomputer, a digital signal processor (DSP) and an application specific integrated circuit (ASIC). The processor, for instance, may be a central processing unit (CPU), a field programmable gate array (FPGA), a tensor processing unit (TPU), etc. The information processing device 105 may include one or more chips of the above elements.

For instance, the information processing device 105 is also configured to preprocess the optical image. Preprocessing can eliminate irrelevant information or noise information in the optical image, so as to better recognize the acquisition object in the optical image. Preprocessing, for instance, may include scaling, gamma correction, image enhancement or de-noising and filtering of the optical image.

For instance, the angle control device 108 may also include elements such as a processor and a rotating machine. The processor in the angle control device 108 can process the position information of the target object sent by the information processing device 105. The rotating machine can control the rotation of the audio acquisition device 102 based on the position information of the target object, so as to change the sound pick-up angle of the audio acquisition device 102.

The acquisition equipment provided by the embodiment acquires and processes the optical image to determine the position of the acquisition object, controls the audio acquisition device for sound source tracking, and can improve the accuracy and the efficiency of sound source tracking, reduce noise, and realize multi-sound-source recognition tracking.

For instance, as shown in FIG. 1, the acquisition equipment 101 further comprises a first power supply 107. The first power supply 107 is configured to provide electric power required for operation for the components in the acquisition equipment 101 under the control of the information processing device 105. The first power supply 107 may include an external DC or AC power cord. The first power supply 107 may also include batteries, for example, primary batteries or secondary batteries.

For instance, as shown in FIG. 1, the acquisition equipment 101 further comprises a first communicator 106. The first communicator 106 is configured to receive and transmit information through wireless signals. The information processing device 105 is also configured to process the information received by the first communicator 106. For instance, the first communicator 106 may be a transceiver.

For instance, the tracking area may also include the communication range of the first communicator 106.

For instance, the information processing device 105, the angle control device 108, the first communicator 106 and the first power supply 107 may be disposed inside the acquisition equipment 101.

Figure 2:
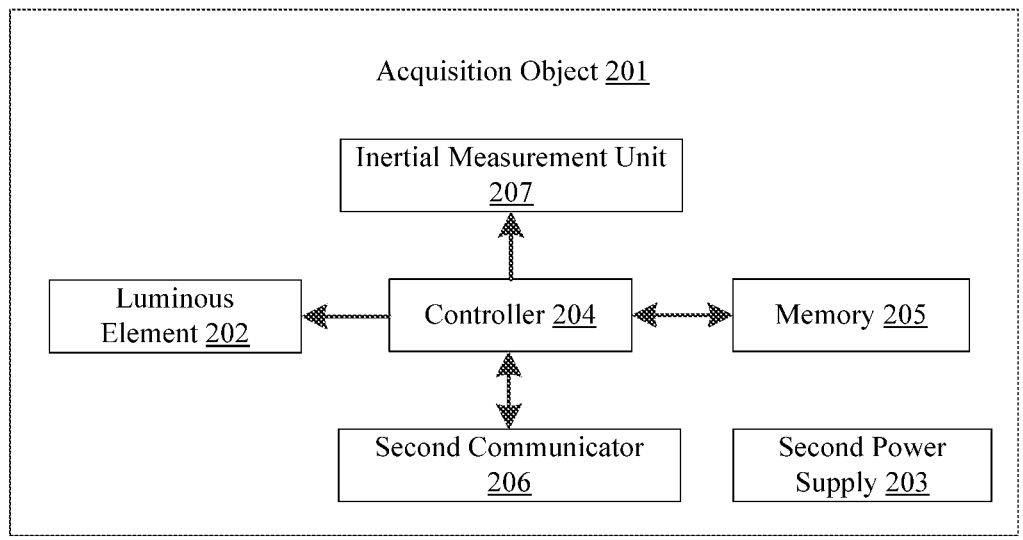
FIG. 2 is a schematic block diagram of an acquisition object in an embodiment of the present disclosure.

FIG. 2 is a schematic block diagram of an acquisition object in an embodiment of the present disclosure.

For instance, as shown in FIG. 2, the acquisition object 201 in the embodiment of the present disclosure may include one or more luminous elements 202. The luminous element 202 is configured to be able to emit light, and the light emitted by the luminous element may be transmitted to the outside of the acquisition object 201. The acquisition object 201 may include a main body structure (for instance, a plastic casing), and the luminous elements 202, for instance, may be distributed on a surface or the inside of the main body structure of the acquisition object 201, as long as the light emitted by the luminous elements 202 can be transmitted to the outside of the acquisition object 201. No limitation will be given here in the present disclosure. For instance, when the luminous elements 202 are distributed inside the acquisition object 201, the light emitted by the luminous elements, for instance, can run through the transparent casing of the acquisition object 201 and be transmitted to the outside of the acquisition object 201.

For instance, when the acquisition object 201 is in the tracking area of the acquisition equipment 101, the luminous element 202 is configured to emit light, and the image acquisition device 104 is configured to acquire the optical image of the tracking area of the acquisition equipment 101. Thus, the image acquisition device 104 can receive the light emitted by the luminous elements 202 and reveal the light in the optical image.

For instance, the acquisition equipment 201 may be a wearable device. The wearable device can be one or more of a bracelet, a watch, spectacles, clothes, a necklace, or other type of wearable devices.

For instance, the luminous element 202 may be a light-emitting diode (LED), a cathode emission lamp, etc. The luminous element 202, for instance, may be an infrared LED array. No limitation will be given here in the embodiment of the present disclosure.

For instance, the light emitted by the luminous elements 202 may be one or more selected from the group consisting of infrared light, visible light and ultraviolet light. In one example, the light emitted by the luminous elements 202 may be infrared light, and the infrared light may be near infrared light or middle infrared light. The wavelength range of the near infrared light is 0.7 μm-2.5 μm. The wavelength range of the middle infrared light may be 2.5 μm-25 μm.

For instance, in the same acquisition object 201, the change modes of luminous parameters of the plurality of luminous elements 202 are all the same. The change modes of the luminous parameters of the luminous elements 202 in different acquisition objects 201 are different from each other, so the acquisition equipment 101 can distinguish different acquisition objects 201 according to the change modes of the luminous parameters of the luminous elements 202 in the acquired optical image, and then realize multi-sound-source tracking.

For instance, the luminous parameters of the luminous element 202 may include one or more selected from the group consisting of the luminous wavelength, the luminous frequency, the luminous band and the luminance. For instance, the acquisition equipment 101 can detect the wavelength of the light emitted by the luminous elements 202, so as to distinguish different acquisition objects 201. The acquisition equipment 101 can also detect the change modes of the luminous parameters of the luminous elements 202 in an optical image sequence within a period of time, so as to distinguish different acquisition objects 201. The change modes of the luminous parameters, for instance, may be taken as identification information of the acquisition object 201, and are transmitted to the acquisition equipment 101 by the acquisition object 201 through wireless signals. When the acquisition equipment 101 detects the change modes of the luminous parameters of the luminous elements 202, the type information of the acquisition object 201 can be determined according to the change modes of the luminous parameters of the luminous elements 202.

For instance, as shown in FIG. 2, the acquisition object 201 further includes an inertial measurement unit 207. The inertial measurement unit 207 is configured to measure the acceleration of the acquisition object 201 and then detect motion information of the acquisition object 201. When the acquisition object 201 is disposed in the tracking area of the acquisition equipment 101, if the luminous elements 202 are shielded, the inertial measurement unit 207 can detect position information of the acquisition object 201 and transmit the position information to the acquisition equipment 101, thereby avoiding the problem that the acquisition object 201 is lost during tracking as the luminous elements 202 are shielded.

For instance, the inertial measurement unit 207 at least has the ability of measuring the horizontal acceleration. Thus, the inertial measurement unit 207 can be a combination of a three-axis acceleration sensor and a three-axis angular velocity sensor, a combination of a three-axis acceleration sensor, a three-axis angular velocity sensor and a three-axis magnetic field sensor, etc. The specific structure of the inertial measurement unit 207 is not limited in the present disclosure.

For instance, the inertial measurement unit 207 is also configured to determine the position of the acquisition object 201.

For instance, as shown in FIG. 2, the acquisition object 201 further includes a second communicator 206. The second communicator 206 is configured to receive and transmit information through wireless signals. For instance, the second communicator 206 may be a transceiver. For instance, the second communicator 206 may communicate with the first communicator 106 by wireless connection modes such as WiFi, Bluetooth or NFC.

For instance, as shown in FIG. 2, the acquisition object 201 further includes a controller 204 and a memory 205. The controller 204 may control the cooperative work of relevant components of the acquisition object 201. The controller 204 is configured to control the luminous elements 202 to emit light, and control the second communicator 206 to transmit and/or receive information and read a measured value of the inertial measurement unit 207. For instance, the controller 204 may include a processor, a micro processor unit (MPU), etc.

For instance, the controller 204 may control the adjustment of one or more luminous parameters of the luminous element 202. The time period of adjusting the luminous parameters shall be longer than the sample interval of the image acquisition device 104. The luminous parameters of the luminous element 202 are adjusted to form a time sequence of changes in luminescence parameters which is taken as the identification information of the acquisition object 201, so as to distinguish different acquisition objects 201. For instance, the brightness of the luminous elements 202 is adjusted to form a time sequence of brightness changes which is taken as the identification information of the acquisition object 201. The color (namely the wavelength) is adjusted to form a time sequence of color changes of, for instance, "red, blue, green, yellow, red, yellow, green" which is taken as the identification information of the acquisition object 201.

For instance, the memory 205 stores codes required for the operation of the controller 204 and the identification information, the type information and the like of the acquisition object 201.

For instance, whether the acquisition object 201 is close to or away from the tracking area of the acquisition equipment 101 may be determined by the case that the first communicator 106 and the second communicator 206 enter or leave respective communication range, and may also be determined by the case that the acquisition object 201 enters or leaves a shooting area (namely an image acquisition area) of the image acquisition device 104. For instance, in one example, when the optical image captured by the image acquisition device 104 includes the acquisition object 201, the first communicator 106 of the acquisition equipment 101 may transmit a trigger signal to the second communicator 206 of the acquisition object 201 through wireless signals; the second communicator 206 transmits the trigger signal to the controller 204; and then the controller 204 controls the luminous elements 201 to emit light. In another example, when the second communicator 206 detects that the first communicator 106 enters the communication range of the second communicator, the second communicator 206 transmits the trigger signal to the controller 204, so that the controller 204 can control the luminous elements 201 to emit light. The trigger signal, for instance, may be a signal for triggering the luminous element 202 to emit light.

For instance, as shown in FIG. 2, the acquisition object 201 further includes a second power supply 203. The second power supply 203 is configured to provide electric power for the luminous elements 202, the controller 204, the memory 205, the second communicator 206 and the inertial measurement unit 207. The second power supply 203 may be a built-in battery, a solar battery, etc. But not limited thereto, the second power supply may also be a primary battery or a secondary battery.

For instance, the second power supply 203, the controller 204, the second communicator 206 and the memory 205 may be disposed inside the main body structure of the acquisition object 201.

For instance, in one embodiment, the position information of the target object may include the position information of the acquisition object 201. Description will be given below to the case that the position information of the target object includes the position information of the acquisition object 201 with reference to FIGS. 4A and 5A.

Figure 4A:
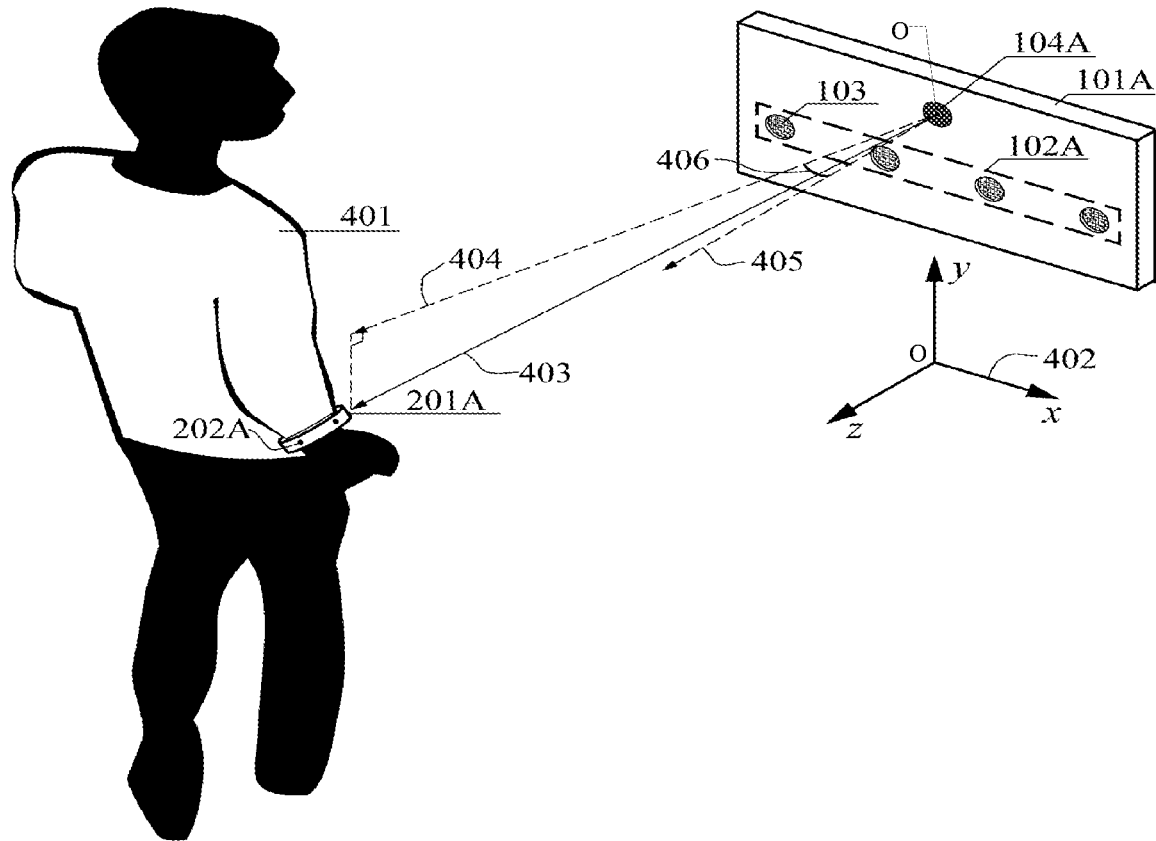
FIG. 4A is a scene diagram illustrating the case that the acquisition equipment tracks an acquisition object in an embodiment of the present disclosure.

For instance, as shown in FIG. 4A, in one example, acquisition equipment 101A comprises an audio acquisition device 102A and an image acquisition device 104A. The image acquisition device 104A may include one monocular camera. The service band of the monocular camera is visible band. The audio acquisition device 102A includes four audio acquisition elements 103. The four audio acquisition elements 103 are arranged in a straight line.

For instance, the audio acquisition device 102A and the image acquisition device 104A can be integrated into a whole. Thus, the audio acquisition device 102A and the image acquisition device 104A rotate synchronously. As shown in FIG. 4A, the audio acquisition device 102A and the image acquisition device 104A can be integrated on a main body casing of the acquisition equipment 101A.

For instance, as shown in FIG. 4A, an information processing device of the acquisition equipment 101A is configured to: establish a camera coordinate system 402 based on the audio acquisition device 102A and the image acquisition device 104A. Thus, the coordinate values in the camera coordinate system 402 (namely O-xyz coordinate system) can be utilized to represent position information of the image acquisition device 104A and position information of the audio acquisition device 102A. An original point O of the camera coordinate system 402 may be the center of the image acquisition device 104A. The y-axis direction of the camera coordinate system 402 may be the direction of a connecting line of the center of the image acquisition device 104A and the center of the audio acquisition device 102A (for instance, the vertical direction in FIG. 4A). The z-axis direction of the camera coordinate system 402 is an optical axis direction 405 of the image acquisition device 104A. The optical axis direction 405 of the image acquisition device 104A may be the normal direction of a surface of the acquisition equipment 101A provided with the image acquisition device 104A. The x-axis direction of the camera coordinate system 402 may be the normal direction of the yz plane.

For instance, in the camera coordinate system 402, the x-axis direction may be the horizontal direction, and the y-axis direction may be the vertical direction.

For instance, the four audio acquisition elements 103 of the audio acquisition device 102A may be arranged in one column along the x-axis direction, so the audio acquisition device 102A can have sound source horizontal positioning ability.

For instance, as shown in FIG. 4A, in some examples, projections of the center of the image acquisition device 104A and the center of the audio acquisition device 102A in the vertical direction (the y-axis direction of the camera coordinate system 402) are roughly coincident. That is, projections of a corresponding point of the center of the image acquisition device 104A in the camera coordinate system 402 and a corresponding point of the center of the audio acquisition device 102A in the camera coordinate system 402 on the xz plane are roughly coincident. If the coordinate value of the center of the image acquisition device 104A in the camera coordinate system 402 is (x1, y1, z1) and the coordinate value of the center of the audio acquisition device 102A in the camera coordinate system 402 is (x2,y2,z2), x1=x2, z1=z2, and y1 and y2 may be same or different.

It should be noted that the center of the image acquisition device 104A may represent the optical center of a lens of the monocular camera. When the plurality of audio acquisition elements 103 of the audio acquisition device 102A are arranged in a straight line, the center of the audio acquisition device 102A may be the middle point of the straight line. When the plurality of audio acquisition elements 103 of the audio acquisition device 102A are arranged in a triangle, the center of the audio acquisition device 102A may be the center of the triangle. When the plurality of audio acquisition elements 103 of the audio acquisition device 102A are arranged in a ring, the center of the audio acquisition device 102A may be the center of the ring.

For instance, in the example as shown in FIG. 4A, the acquisition object 201A is a bracelet. The acquisition object 201A includes a plurality of (for instance, four or five) red LED lamps uniformly arranged on a surface of the bracelet. The change modes of luminous parameters of the plurality of red LED lamps are the same. For instance, the plurality of red LED lamps can emit light according to same brightness change law.

Figure 3:
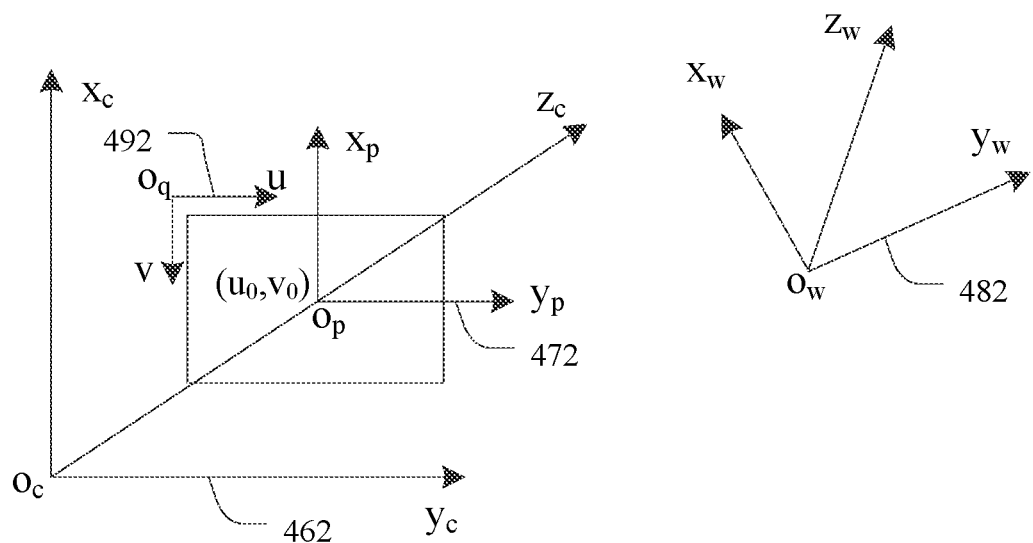
FIG. 3 is a schematic diagram of a coordinate system of a camera calibration model.

For instance, camera calibration utilizes an image captured by a camera to restore an object in the space. Camera calibration may adopt a pinhole model. As shown in FIG. 3, in the camera calibration model, a camera coordinate system 462 (namely $o_c$-$x_c y_c z_c$ coordinate system) is a coordinate system established based on the camera; an image coordinate system 472 (namely $o_p$-$x_p y_p$ coordinate system) is a coordinate system established based on the optical image of the target object acquired by the camera; a world coordinate system (WCS) 482 (namely $o_w$-$x_w y_w z_w$ coordinate system) is a coordinate system established based on the target object; and a coordinate system 492 (namely $o_q$-uv coordinate system) is a pixel coordinate system. The WCS 482 may be freely placed according to computing requirements. An original point $o_c$ of the camera coordinate system 462 may be disposed on the optical center of the camera (namely a projective center), and an original point $o_p$ of the image coordinate system 472 may be disposed on an intersecting point ($u_0,v_0$) of the optical axis of the camera and an imaging plane. The $z_c$ axis of the camera coordinate system 462 is the optical axis of the camera, and $x_c$ and $y_c$ axes of the camera coordinate system 462 are respectively parallel to $x_p$ and $y_p$ axes of the image coordinate system 472. The $x_p$ and $y_p$ axes of the image coordinate system 472 are also respectively parallel to v and u axes of the pixel coordinate system 492. The coordinate ($x_c,y_c$) of each point in the image coordinate system 472 is mainly used for representing the perspective projection relationship of the object from the camera coordinate system 462 to the image coordinate system 472. The pixel coordinate (u,v) of each point in the pixel coordinate system 492 represents the column number and the row number of pixels and can be obtained from the camera.

For instance, in the coordinate transformation process, the optical image under the image coordinate system 472 must be transformed into the camera coordinate system 462 and then transformed into the WCS 482. Thus, each point in the optical image can correspond to corresponding point in the WCS 482. The image coordinate system 472 and the camera coordinate system 462 realize mutual transformation through perspective projection, and the camera coordinate system 462 and the WCS 482 realize mutual transformation through rigid body changes (rotation and translation).

For instance, in the embodiment of the present disclosure, the camera coordinate system 402 is the camera coordinate system 462 in FIG. 3. The coordinate system provided with the optical image may be the image coordinate system 472 in FIG. 3.

For instance, in the example as shown in FIG. 4A, the information processing device of the acquisition equipment 101A is also configured to: determine image position information of the acquisition object 201A in the optical image; and determine the horizontal azimuth of the acquisition object 201A according to the image position information, in which the position information of the target object includes the horizontal azimuth of the acquisition object. An angle control device of the acquisition equipment 101A is also configured to receive the horizontal azimuth of the acquisition object, and control the sound pick-up angle of the audio acquisition device according to the horizontal azimuth of the acquisition object.

For instance, the horizontal azimuth of the acquisition object 201A may represent the horizontal azimuth of the acquisition object 201A relative to the image acquisition device 104A in the 3D space. As the image acquisition device 104A and the audio acquisition device 102A are integrated into a whole, the horizontal azimuth of the acquisition object 201A is the horizontal azimuth of the acquisition object 201A relative to the audio acquisition device 102A in the 3D space. Thus, the horizontal azimuth of the acquisition object 201A may be set to be the sound pick-up angle of the audio acquisition device 102A.

For instance, the horizontal azimuth of the acquisition object 201A represents the horizontal azimuth of the acquisition object 201A in the camera coordinate system 402.

For instance, the image acquisition device 104A may receive the light emitted by a luminous element 202A and reveal the light in the optical image. Thus, the information processing device of the acquisition equipment 101A may determine image position information of the luminous element 202A in the optical image by processing the optical image, transform the image position information of the luminous element 202A into the camera coordinate system 402, and then determine camera position vectors of the luminous element 202A in the camera coordinate system 402. As shown in FIG. 4A, in the camera coordinate system 402, the camera position vector of the luminous element 202A may be taken as a camera position vector 403 of the acquisition object 201A. A projection of the camera position vector 403 of the acquisition object 201A on the xz plane is a horizontal projection position vector 404 of the acquisition object 201A. A first horizontal azimuth 406 may be an angle between the horizontal projection position vector 404 of the acquisition object 201A and the optical axis direction 405 of the image acquisition device 104A. The first horizontal azimuth 406 represents the horizontal azimuth of the acquisition object 201A, that is, the first horizontal azimuth 406 may be set to be the sound pick-up angle of the audio acquisition device 102A.

Figure 5A:
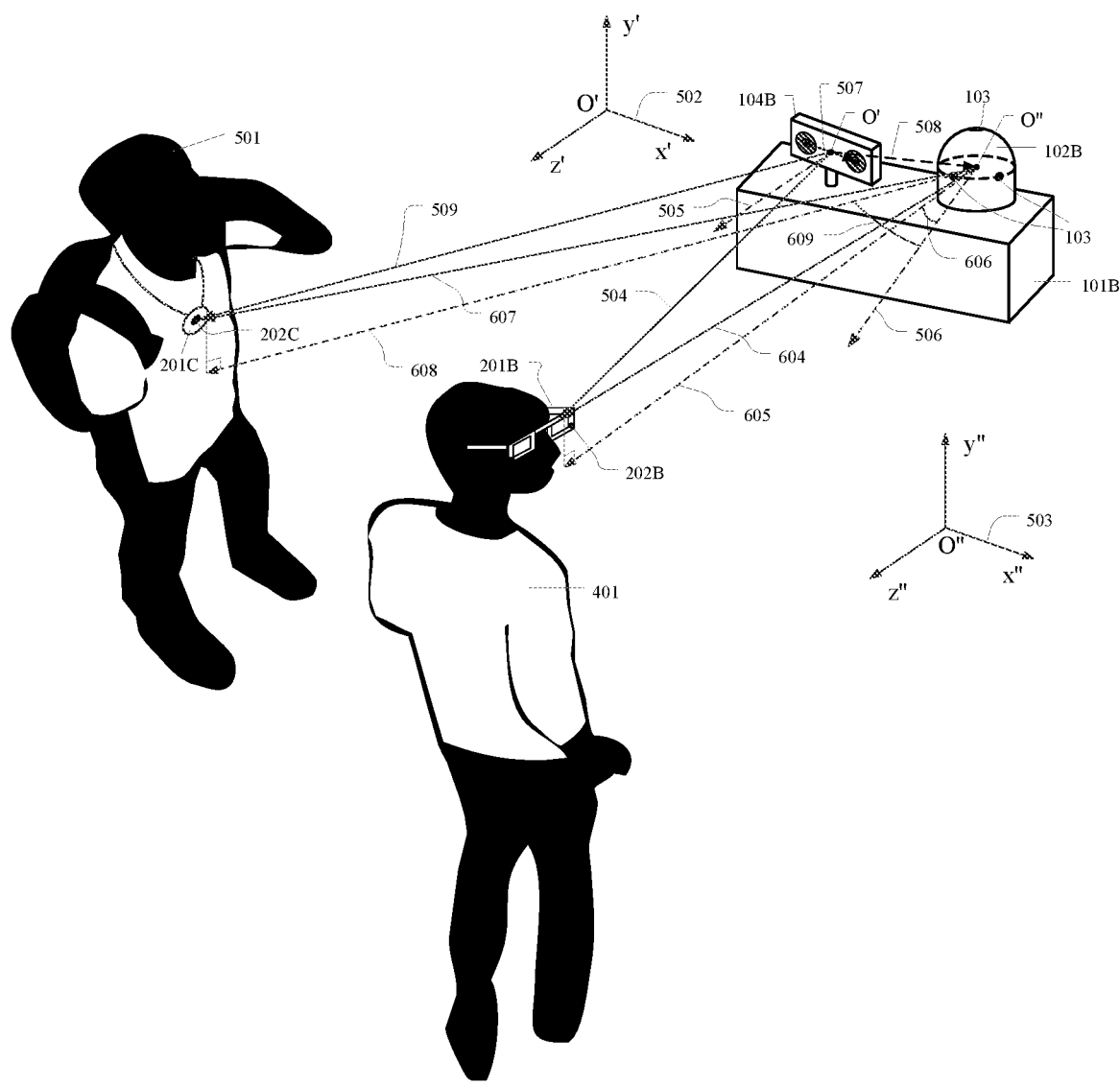
FIG. 5A is a scene diagram illustrating the case that another acquisition equipment tracks acquisition objects in an embodiment of the present disclosure.

For instance, as shown in FIG. 5A, in another example, an acquisition equipment 101B may comprise an audio acquisition device 102B and an image acquisition device 104B. The image acquisition device 104B may include a rotatable binocular camera. The service band of the binocular camera may be infrared band. The sampling rate of the binocular camera may be 25 frames/sec. The audio acquisition device 102B includes five audio acquisition elements 103. The five audio acquisition elements 103 are arranged in a spherical array. The audio acquisition device 102B may have sound source three-dimensional positioning ability.

For instance, as shown in FIG. 5A, an information processing device of the acquisition equipment 101B is also configured to: establish a camera coordinate system 502 based on the image acquisition device 104B, and establish an audio acquisition coordinate system 503 based on the audio acquisition device 102B. Thus, the coordinate value in the camera coordinate system 502 (namely O'-x'y'z' coordinate system) may be utilized to represent position information of the image acquisition device 104B, and the coordinate value in the audio acquisition coordinate system 503 (namely O"-x"y"z" coordinate system) may be utilized to represent position information of the audio acquisition device 102B. An original point O' of the camera coordinate system 502 may be the middle point of two cameras of the image acquisition device 104B; the x'-axis direction of the camera coordinate system 502 may be the direction of a connecting line of the two cameras of the image acquisition device 104B; and the z'-axis direction of the camera coordinate system 502 may be an optical axis direction 505 of the image acquisition device 104B. The y'-axis direction of the camera coordinate system 502 may be along the normal direction of the x'z' plane. An original point O" of the audio acquisition coordinate system 503 may be the center of the audio acquisition device 102B (for instance, the center of a sphere formed by the five audio acquisition elements 103); the z"-axis direction of the audio acquisition coordinate system 503 may be the normal direction 506 of the acquisition equipment 101B; the y" axis of the audio acquisition coordinate system 503 may be parallel to the y' axis of the camera coordinate system 502; and the x" axis direction of the audio acquisition coordinate system 503 may be along the normal direction of the y"z" plane.

For instance, as shown in FIG. 5A, a rotation axis of the binocular camera in the image acquisition device 104B may be along the y'-axis direction, namely the binocular camera may rotate around the y'-axis direction. Moreover, for instance, the rotation axis of the binocular camera in the image acquisition device 104B may run through the original point O" of the audio acquisition coordinate system 503, that is, in the y'-axis direction, projections of the original point O' of the camera coordinate system 502 and the original point O" of the audio acquisition coordinate system 503 coincide each other. An angle control device of the acquisition equipment 101B may control the rotation of the binocular camera. The rotation angle of the binocular camera, for instance, may be obtained through a servo motor, an angular sensor, a hall sensor, etc. No limitation will be given here in the present disclosure.

For instance, the distance between the two cameras in the image acquisition device 104B may be represented as the camera distance 507. The camera distance 507 is known in advance and kept unchanged in the camera coordinate system 502.

For instance, the distance between the center of the audio acquisition device 102B and the center of the image acquisition device 104B may be represented as original point distance 508. The original point distance 508 is known in advance and kept unchanged in both the audio acquisition coordinate system 503 and the camera coordinate system 502.

For instance, the camera coordinate system 502 and the audio acquisition coordinate system 503 may realize mutual transformation according to the rotation angle and the original point distance 508 of the binocular camera, that is, the coordinate (x', y', z') of the camera coordinate system 502 can be transformed into corresponding coordinate (x", y", z") in the audio acquisition coordinate system 503.

For instance, the example as shown in FIG. 5A may include an acquisition object 201B, and the acquisition object 201B is a pair of spectacles. A luminous element 202B of the acquisition object 201B may include two infrared LED lamps, and the two infrared LED lamps may be respectively disposed on surfaces at two ends of a spectacles frame of the spectacles, but it is not limited thereto. The acquisition object 201B may also include one infrared LED lamp, or the acquisition object 201B may also include three or four infrared LED lamps, and the three or four infrared LED lamps may be uniformly distributed on the surfaces of the spectacles frame of the spectacles.

For instance, in the example as shown in FIG. 5A, the information processing device of the acquisition equipment 101B is also configured to: determine camera position information of the acquisition object 201B in the camera coordinate system 502; transform the camera position information of the acquisition object 201B into audio acquisition position information in the audio acquisition coordinate system 503; and determine the azimuth of the acquisition object 201B in the audio acquisition coordinate system 503 according to the audio acquisition position information, in which the position information of the target object includes the azimuth of the acquisition object 201B in the audio acquisition coordinate system 503. For instance, the angle control device of the acquisition equipment 101B is also configured to receive the azimuth of the acquisition object 201B, and control the sound pick-up angle of the audio acquisition device 102 according to the azimuth of the acquisition object 201B.

For instance, the azimuth of the acquisition object 201B in the audio acquisition coordinate system 503 is the azimuth of the acquisition object 201B relative to the audio acquisition device 102B in the 3D space. Thus, the azimuth of the acquisition object 201B in the audio acquisition coordinate system 503 may be set to be the sound pick-up angle of the audio acquisition device 102B.

For instance, the image acquisition device 104B may receive the light emitted by the luminous element 202B of the acquisition object 201B and reveal the light in the optical image. Thus, the information processing device of the acquisition equipment 101B may determine image position information of the luminous element 202B in the optical image by processing the optical image, transform the image position information of the luminous element 202B into the camera coordinate system 502 to obtain camera position information of the luminous element 202B in the camera coordinate system 502, and then transform the camera position information of the luminous element 202B into audio acquisition position information of the luminous elements in the audio acquisition coordinate system 503. As shown in FIG. 5A, a vector 504 represents a camera position vector of the luminous element 202B in the camera coordinate system 502, namely a camera position vector of the acquisition object 201B. The camera position vector 504 of the acquisition object 201B may be obtained by calculation according to respective positions of the luminous elements 202B in two camera images of the image acquisition device 104B, the focal length of the camera, the rotation angle and the camera distance 507. A vector 604 represents an audio acquisition position vector of the luminous element 202B in the audio acquisition coordinate system 503, namely an audio acquisition position vector of the acquisition object 201B. The audio acquisition position vector 604 of the acquisition object 201B may be determined according to the rotation angle of the image acquisition device 104B, the original point distance 508, and the camera position vector 504 of the acquisition object 201B. For instance, as the relative position between the two original points O' and O"

is fixed, the vector between the original points O' and O" can be obtained, and then the audio acquisition position vector 604 under the audio acquisition coordinate system 503 can be obtained according to the camera position vector 504 in the camera coordinate system 502. The vector between the original points O' and O", the camera position vector 504 and the audio acquisition position vector 604 form a head-tail connecting triangle.

The azimuth of the acquisition object 201B may be the solid angle of the audio acquisition position vector 604 of the acquisition object 201B in the audio acquisition coordinate system 503. A projection of the audio acquisition position vector 604 of the acquisition object 201B on the x"z" plane is a horizontal projection position vector 605 of the acquisition object 201B. The second horizontal azimuth 606 may be an angle between the horizontal projection position vector 605 of the acquisition object 201B and the normal direction 506 of the acquisition equipment 101B. The second horizontal azimuth 606 is the horizontal azimuth of the acquisition object 201B. The first vertical azimuth (not shown) may be an angle between the audio acquisition position vector 604 and the horizontal projection position vector 605 of the acquisition object 201B. The first vertical azimuth is the vertical azimuth of the acquisition object 201B. The solid angle of the audio acquisition position vector 604 in the audio acquisition coordinate system 503 includes the horizontal azimuth and/or the vertical azimuth of the acquisition object 201, that is, the sound pick-up angle of the audio acquisition device 102B may be the second horizontal azimuth 606 and/or the first vertical azimuth. For instance, in one example, the azimuth of the acquisition object 201B may include the horizontal azimuth of the acquisition object 201B, namely the second horizontal azimuth 606 may be set to be the first sound pick-up angle of the audio acquisition device 102B. In another example, the azimuth of the acquisition object 201B is a 3D azimuth angle and may include the horizontal azimuth and the vertical azimuth of the acquisition object 201B, that is, the first vertical azimuth and the second horizontal azimuth 606 are set to be the first sound pick-up angle of the audio acquisition device 102B, so the audio acquisition device 102B can be more accurately aligned to the direction of the acquisition object 201B.

For instance, the example as shown in FIG. 5A may further comprise an acquisition object 201C, and the acquisition object 201C is a necklace. Luminous elements 202C on the acquisition object 201C may also include two infrared LED lamps, and the two infrared LED lamps may be respectively disposed on positive and negative surfaces of a pendant of the necklace.

For instance, as shown in FIG. 5A, the change modes of luminous parameters (e.g., luminance) of the two infrared LED lamps on the luminous element 202B (namely the luminous element disposed on the spectacles) are the same. The change modes of luminous parameters (for instance, luminance) of the two infrared LED lamps on a luminous element 202C (namely the luminous element disposed on the necklace) are also same. The change modes of the luminous parameters of the two infrared LED lamps on the luminous element 202B are different from the change modes of the luminous parameters of the two infrared LED lamps on the luminous element 202C, so the information processing device of the acquisition device 101B can distinguish the acquisition object 201B and the acquisition object 201C according to the change modes of the luminous parameters of the infrared LED lamps.

For instance, the brightness change laws of the luminous element 202B and the luminous element 202C are mutually different. The change law of the luminous element 202B may be based on a binary identifier stored in a memory of the acquisition object 201B. The change law of the luminous element 202C may be based on a binary identifier stored in a memory of the acquisition object 201C. Binaries 1 and 0 respectively represent the light and dark of the brightness, and the duration of the brightness corresponding to each binary symbol, for instance, may be 0.4 s.

It should be noted that the positioning process of the acquisition object 201C is similar to the positioning process of the acquisition object 201B, so no further description will be given here.

For instance, as shown in FIG. 5A, a vector 509 represents a camera position vector of the luminous element 202C in the camera coordinate system 502, namely a camera position vector of the acquisition object 201C. A vector 607 represents an audio acquisition position vector of the luminous element 202C in the audio acquisition coordinate system 503, namely an audio acquisition position vector of the acquisition object 201C. A vector 608 represents a horizontal projection position vector of the acquisition object 201C. The azimuth of the acquisition object 201C may be the solid angle of the audio acquisition position vector 607 of the acquisition object 201C in the audio acquisition coordinate system 503. The third horizontal azimuth 609 may be an angle between the horizontal projection position vector 608 of the acquisition object 201C and the normal direction 506 of the acquisition equipment 101B. The third horizontal azimuth 609 is the horizontal azimuth of the acquisition object 201C. The second vertical azimuth (not shown) may be an angle between the audio acquisition position vector 607 and the horizontal projection position vector 608 of the acquisition object 201C. The second vertical azimuth is the vertical azimuth of the acquisition object 201C. For instance, in one example, the azimuth of the acquisition object 201C may include the horizontal azimuth of the acquisition object 201C, that is, the third horizontal azimuth 609 may be set to be the second sound pick-up angle of the audio acquisition device 102B. In another example, the azimuth of the acquisition object 201C is a 3D azimuth angle and may include the horizontal azimuth and the vertical azimuth of the acquisition object 201C, that is, the second vertical azimuth and the third horizontal azimuth 609 are set to be the second sound pick-up angle of the audio acquisition device 102B. Thus, the acquisition equipment 101B can realize multi-acquisition-object (namely sound source) tracking.

For instance, in another embodiment, the target object may be a user and includes a sound source; the sound source is the mouth of the user; and the optical image includes the sound source. Description will be given below by taking the case that the sound source is the mouth of the user as an example with reference to FIGS. 4B-4C and 5B-5C.

Figure 4B:
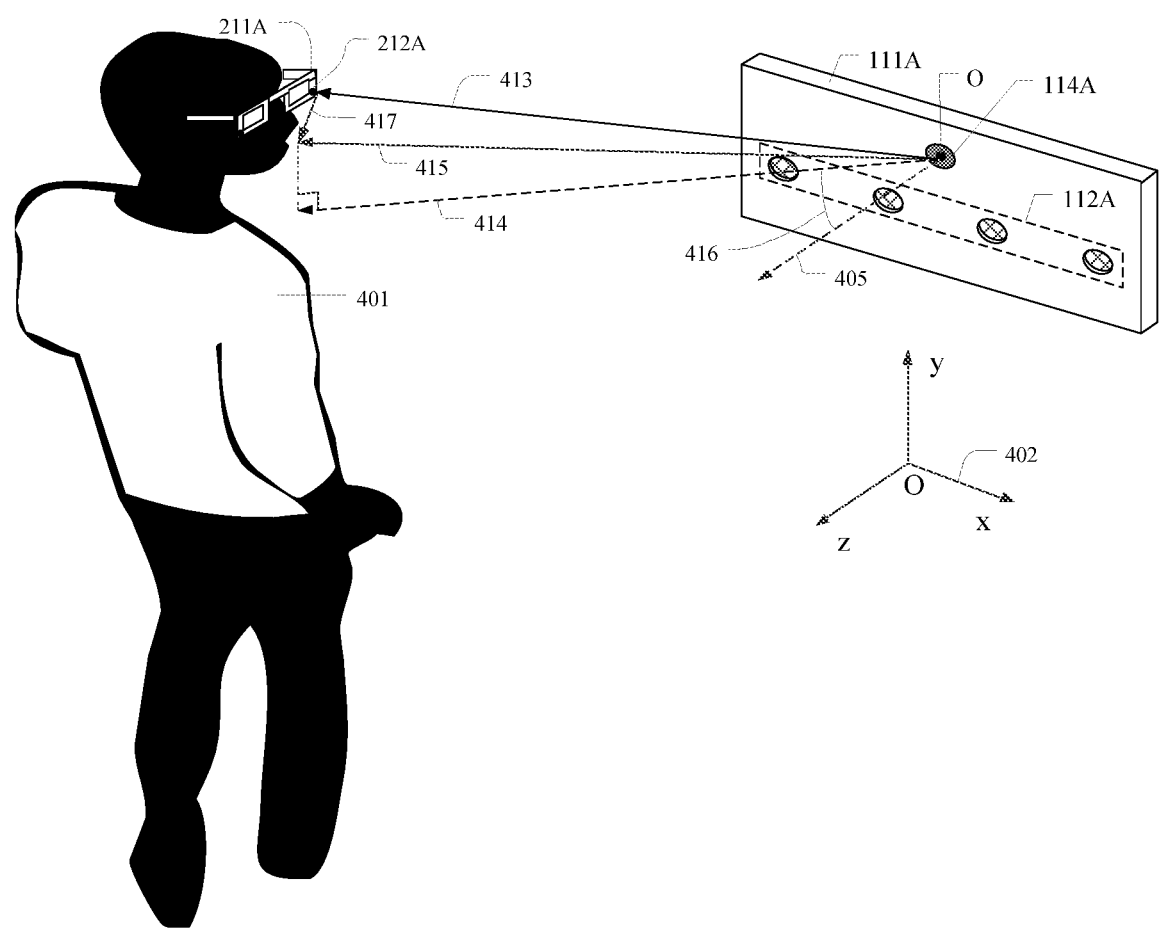
FIG. 4B is another scene diagram illustrating the case that the acquisition equipment tracks an acquisition object in an embodiment of the present disclosure.

For instance, as shown in FIG. 4B, in one example, acquisition equipment 111A comprises an audio acquisition device 112A and an image acquisition device 114A. Both the image acquisition device 114A and the audio acquisition device 112A are disposed in the camera coordinate system 402.

For instance, as shown in FIG. 4B, the acquisition object 211A may be a pair of spectacles. The acquisition object 211A as shown in FIG. 4B may be same with or similar to the acquisition object 201B as shown in FIG. 5A, but not limited thereto. The two acquisition objects may also be different. For instance, a luminous element 212A of the acquisition object 211A as shown in FIG. 4B may include three infrared LED lamps.

It should be noted that the acquisition equipment 111A in the example as shown in FIG. 4B is the same with or similar to the acquisition equipment 101A in the example as shown in FIG. 4A, so no further description will be given here.

For instance, as shown in FIG. 4B, the target object may be a first user 401, and the sound source may be the mouth of the first user 401, but is not limited thereto. The target object may also be an electronic device, a robot or the like, and the sound source, for instance, may also be a loudspeaker in the electronic device, a voice playback system on the robot, etc.

For instance, the processing processes of the example as shown in FIG. 4B and the example as shown in FIG. 4A are basically the same, and the difference includes: the example as shown in FIG. 4B may determine the horizontal azimuth of the sound source in the camera coordinate system 402, so that the sound pick-up angle of the audio acquisition device 102A can be more accurate.

For instance, in the example as shown in FIG. 4B, the image acquisition device 114A and the audio acquisition device 112A are also integrated into a whole. The signal processing device of the acquisition equipment 111A is configured to: determine image position information of the acquisition object 211A in the optical image; determine first image relative position information between the acquisition object 211A and the sound source in the optical image; and determine the horizontal azimuth of the sound source according to the image position information of the acquisition object 211A and the first image relative position information, in which the position information of the target object includes the horizontal azimuth of the sound source. An angle control device of the acquisition equipment 111A is also configured to receive the horizontal azimuth of the sound source, and control the sound pick-up angle of the audio acquisition device 112A according to the horizontal azimuth of the sound source.

For instance, the horizontal azimuth of the sound source may represent the horizontal azimuth of the sound source relative to the image acquisition device 114A in the 3D space. As the image acquisition device 114A and the audio acquisition device 112A are integrated into a whole, the horizontal azimuth of the sound source is the horizontal azimuth of the sound source relative to the audio acquisition device 112A in the 3D space. Thus, the horizontal azimuth of the sound source may be set to be the sound pick-up angle of the audio acquisition device 112A.

For instance, the horizontal azimuth of the sound source may represent the horizontal azimuth of the sound source in the camera coordinate system 402.

For instance, the first image relative position information between the acquisition object 211A and the sound source may be preset and kept unchanged. As shown in FIG. 4B, the first image relative position information may be relative position information between the eyes and the mouth of the first user 401 in the optical image. Thus, the information processing device of the acquisition equipment 111A may be configured to process the optical image to determine image position information of the luminous element 212A (namely the acquisition object 211A) in the image coordinate system, determine image position information of the sound source according to the image position information of the acquisition object 211A (namely the image position information of the luminous element 212A) and the first image relative position information, transform the image position information of the sound source into the camera coordinate system 402, and determine a camera sound source position vector of the sound source in the camera coordinate system 402.

As shown in FIG. 4B, in the camera coordinate system 402, a vector 413 is a camera position vector of the acquisition object 211A, and the camera position vector 413 of the acquisition object 211A may be determined according to the image position information of the acquisition object 211A in the optical image. A vector 417 is a vector of the first image relative position information on the optical image. A vector 415 may be determined according to the vectors 413 and 417, and is a camera sound source position vector of the sound source. On the optical image, the image position information of the sound source in the optical image can be determined according to the vector 417 and the image position information of the acquisition object 211A, and the camera sound source position vector 415 of the sound source can be determined according to the image position information of the sound source. For instance, the vectors 413, 415 and 417 form a head-tail connecting triangle. When two sides 413 and 417 of the triangle are known, the third side 415 can be determined. A vector 414 is a horizontal projection position vector of the sound source, namely a projection of the camera sound source position vector of the sound source on the xz plane. The fourth horizontal azimuth 416 may be an angle between the horizontal projection position vector 414 of the sound source and an optical axis direction 405 of the image acquisition device 114A. The fourth horizontal azimuth 416 represents the horizontal azimuth of the sound source, that is, the fourth horizontal azimuth 416 may be set to be the sound pick-up angle of the audio acquisition device 102A.

Figure 4C:
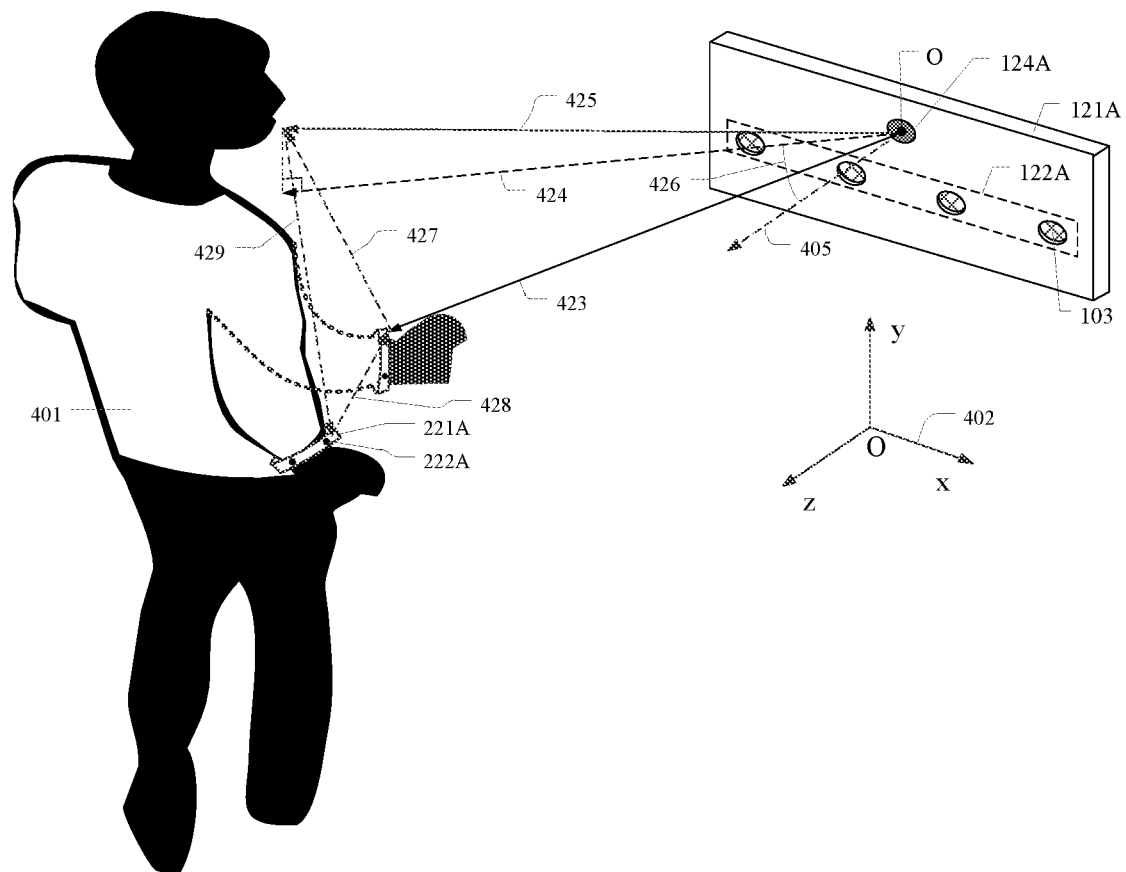
FIG. 4C is still another scene diagram illustrating the case that the acquisition equipment tracks an acquisition object in an embodiment of the present disclosure.

For instance, as shown in FIG. 4C, in another example, the acquisition equipment 121A comprises an audio acquisition device 122A and an image acquisition device 124A.

For instance, as different from the example as shown in FIG. 4B, the acquisition object 221A in the example as shown in FIG. 4C may be a bracelet. Thus, the relative position relationship between the acquisition object 221A and the sound source may change along with the movement of the first user 401. The acquisition object 221A as shown in FIG. 4C and the acquisition object 201A as shown in FIG. 4A may be same, but not limited thereto, may also be different.

It should be noted that the acquisition equipment 121A, the sound source and the like in the example as shown in FIG. 4C may be the same with those in the example as shown in FIG. 4B, so no further description will be given here.

For instance, in the example as shown in FIG. 4C, an information processing device of the acquisition equipment 121A is configured to: determine image reference position information of the acquisition object 221A in the optical image; determine second image relative position information between the image position information and the image reference position information of the acquisition object 221A in the optical image; acquire third image relative position information between the sound source and the image reference position information; and determine the first image relative position information between the acquisition object 221A and the sound source according to the third image relative position information and the second image relative position information.

For instance, the image reference position information is relevant to the acquisition object 221A. For instance, the image reference position information may be corresponding position information of a most possible wearing position in the optical image when the acquisition object 221A is in the most possible wearing position. The most possible wearing position, for instance, may represent the position of the acquisition object 221A on the first user 401 when the first user 401 is in natural standing state. The information processing device of the acquisition equipment 121A may acquire contour information of the first user 401 on the optical image by the image processing of the optical image. The image reference position information in the optical image can be determined according to the contour information of the first user 401 and the type of the acquisition object 221A.

For instance, after determining the image reference position information, the third image relative position information between the sound source and the image reference position information can be determined according to body parameters of the first user 401.

It should be noted that on the contour of the user, the image reference position information and the third image relative position information are fixed and do not change along with the motion of the user. Thus, the image reference position information and the third image relative position information may be detected in advance and stored in the acquisition object 221A.

For instance, if the acquisition object 221A is a bracelet, the most possible wearing position of the bracelet is the wrist, and the image reference position information may be corresponding position information of the wrist position in the optical image when the hand of the first user 401 is naturally hanging. In motion and posture trajectories of the bracelet, if the motion trajectory is roughly a cycloid, it may correspond to the case that the bracelet is located on the wrist, and a point frequently appearing at the bottom of the cycloid is mostly likely to correspond to the wrist position when the hand is naturally hanging. The position information of the point at the bottom of the cycloid is the image reference position information. The hand length of the first user 401 can be determined according to the body parameters of the first user 401, so the mouth position (namely the sound source) of the first user 401 can be determined according to the image reference position information and the hand length of the first user 401. Moreover, for instance, if the acquisition object 221A is spectacles, the most possible wearing position of the spectacles is the eyes. In motion and posture trajectories of the spectacles, if the motion trajectory is roughly a straight line of the same height, it may correspond to the situation where the spectacles are stabilized on the nose bridge. Thus, the eye position of the first user 401 can be determined, and the mouth position of the first user 401 (namely the sound source) can be determined according to the head size of common people.

For instance, information such as the body parameters of the first user 401 and the wearing position of the acquisition object 221A may be input in advance for subsequent calculation. The information such as the body parameters of the first user 401 and the wearing position of the acquisition object 221A may be stored in a memory of the acquisition object 221A.

For instance, as shown in FIG. 4C, on the optical image (that is, in the image coordinate system), a vector 428 is a vector of the second image relative position information; a vector 429 is a vector of the third image relative position information; and a vector 427 is a vector of the first image relative position information and may be determined according to the vectors 428 and 429 (the vectors 427, 428 and 429 form three sides of a triangle). In the camera coordinate system 402, a vector 423 is a camera position vector of the acquisition object 221A; a vector 425 is a camera sound source position vector of the sound source; and a vector 424 is a horizontal projection position vector of the sound source, namely a projection of the camera sound source position vector 425 of the sound source on the xz plane. The fifth horizontal azimuth 426 may be an angle between the horizontal projection position vector 424 of the sound source and the optical axis direction 405 of the image acquisition device 124A, represents the horizontal azimuth of the sound source, and may be set to be the sound pick-up angle of the audio acquisition device 102A.

It should be noted that the processing processes after determining the first image relative position information in the example as shown in FIG. 4C are the same with the processing processes in the example as shown in FIG. 4B, so no further description will be given here. That is, after determining the first image relative position information between the acquisition object and the sound source (namely the vector 427), the camera sound source position information (namely the camera sound source position vector 425) of the sound source can be acquired according to the camera position information (namely the camera position vector 423) of the acquisition object 221A, and then the fifth horizontal azimuth 426 is acquired according to the camera sound source position information (namely the camera sound source position vector 425) of the sound source.

Figure 5B:
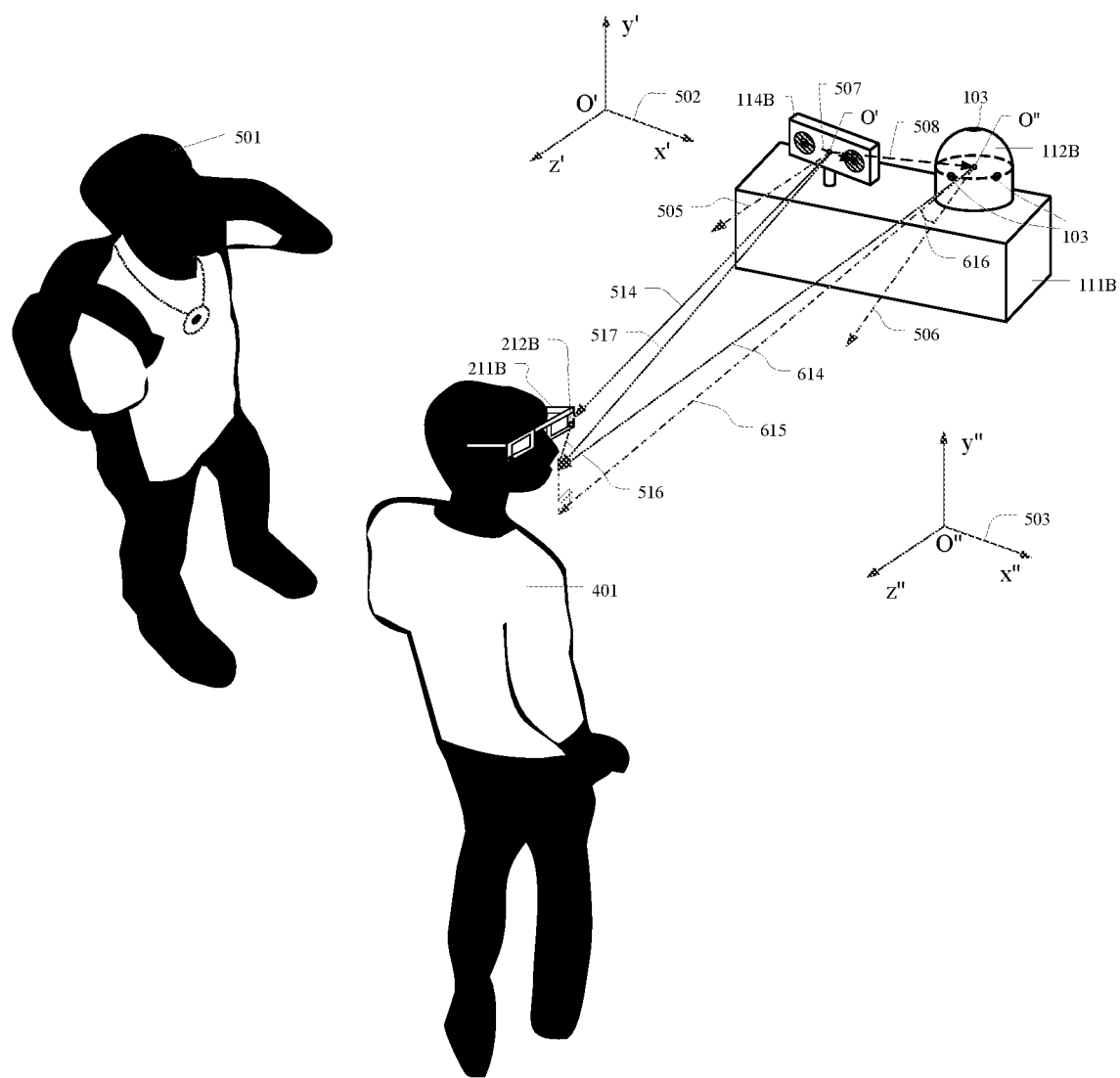
FIG. 5B is another scene diagram illustrating the case that another acquisition equipment tracks acquisition objects in an embodiment of the present disclosure.

For instance, as shown in FIG. 5B, in still another example, the acquisition equipment 111B comprises an audio acquisition device 112B and an image acquisition device 114B. A signal processing device of the acquisition equipment 111B is also configured to: establish a camera coordinate system based on the image acquisition device 114B, and establish an audio acquisition coordinate system based on the audio acquisition device 112B. Thus, the coordinate value in the camera coordinate system 502 (namely O'-x'y'z' coordinate system) can be utilized to represent position information of the image acquisition device 114B, and the coordinate value of the audio acquisition coordinate system 503 (namely O"-x"y"z" coordinate system) can be utilized to represent position information of the audio acquisition device 112B.

It should be noted that the acquisition equipment 111B and the acquisition object 211B in the example as shown in FIG. 5B may be respectively the same with the acquisition equipment 101B and the acquisition object 201B in the example as shown in FIG. 5A, so no further description will be given here.

For instance, as shown in FIG. 5B, the target object includes a first user 401, and the sound source may be the mouth of the first user 401.

For instance, as shown in FIG. 5B, an information processing device of the acquisition equipment 111B is also configured to: determine camera position information of the acquisition object 211B in the camera coordinate system 502; determine first camera relative position information between the acquisition object 211B and the sound source in the camera coordinate system 502; determine camera sound source position information of the sound source in the camera coordinate system 502 according to the camera position information of the acquisition object 211B and the first camera relative position information; transform the camera sound source position information into audio acquisition sound source position information in the audio acquisition coordinate system 503; and determine the azimuth of the sound source in the audio acquisition coordinate system according to the audio acquisition sound source position information, in which the position information of the target object includes the azimuth of the sound source in the audio acquisition coordinate system 503. An angle control device of the acquisition equipment 111B is also configured to receive the azimuth of the sound source, and control the sound pick-up angle of the audio acquisition device according to the azimuth of the sound source.

For instance, the azimuth of the sound source in the audio acquisition coordinate system 503 may represent the horizontal azimuth of the sound source relative to the image acquisition device 114B in the 3D space. As the image acquisition device 114B and the audio acquisition device 112B are integrated into a whole, the azimuth of the sound source in the audio acquisition coordinate system 503 is the azimuth of the sound source relative to the audio acquisition device 112B in the 3D space. Thus, the azimuth of the sound source in the audio acquisition coordinate system 503 may be set to be the sound pick-up angle of the audio acquisition device 112B.

For instance, the horizontal azimuth of the sound source may represent the horizontal azimuth of the sound source in the camera coordinate system 402.

For instance, the first camera relative position information between the acquisition object 211B and the sound source may be preset and fixed. As shown in FIG. 5B, the first camera relative position information may be relative position information between the eyes and the mouth of the first user 401 in the camera coordinate system 502. In the camera coordinate system 502, a vector 514 represents a camera position vector of the acquisition object 211B. A vector 516 is a vector of the first camera relative position information. The vector 516 may be preset according to the body parameters of the first user 401 and the type of the acquisition object 211B. A vector 517 represents a camera sound source position vector of the sound source and may be determined according to the vectors 514 and 516. In the audio acquisition coordinate system 503, a vector 614 represents an audio acquisition sound source position vector of the sound source and can be obtained by the transformation of the vector 517. The azimuth of the sound source may be the solid angle of the audio acquisition sound source position vector 614 of the sound source in the audio acquisition coordinate system 503. A projection of the audio acquisition sound source position vector 614 of the sound source on the x"z" plane is a horizontal projection position vector 615 of the sound source. The sixth horizontal azimuth 616 may be an angle between the horizontal projection position vector 615 of the sound source and the normal direction 506 of the acquisition equipment 111B. The sixth horizontal azimuth 616 is the horizontal azimuth of the sound source. The third vertical azimuth (not shown) may be an angle between the audio acquisition sound source position vector 614 and the horizontal projection position vector 615 of the sound source. The third vertical azimuth is the vertical azimuth of the sound source. The solid angle of the audio acquisition sound source position vector 614 in the audio acquisition coordinate system 503 includes the horizontal azimuth and/or the vertical azimuth of the sound source. For instance, in one example, the azimuth of the sound source may include the horizontal azimuth of the sound source, that is, the sixth horizontal azimuth 616 may be set to be one sound pick-up angle of the audio acquisition device 112B. But it is not limited thereto, and the azimuth of the sound source is a 3D stereo azimuth and may include the horizontal azimuth (for instance, the sixth horizontal azimuth 616) and the vertical azimuth (for instance, the third vertical azimuth) of the sound source.

Figure 5C:
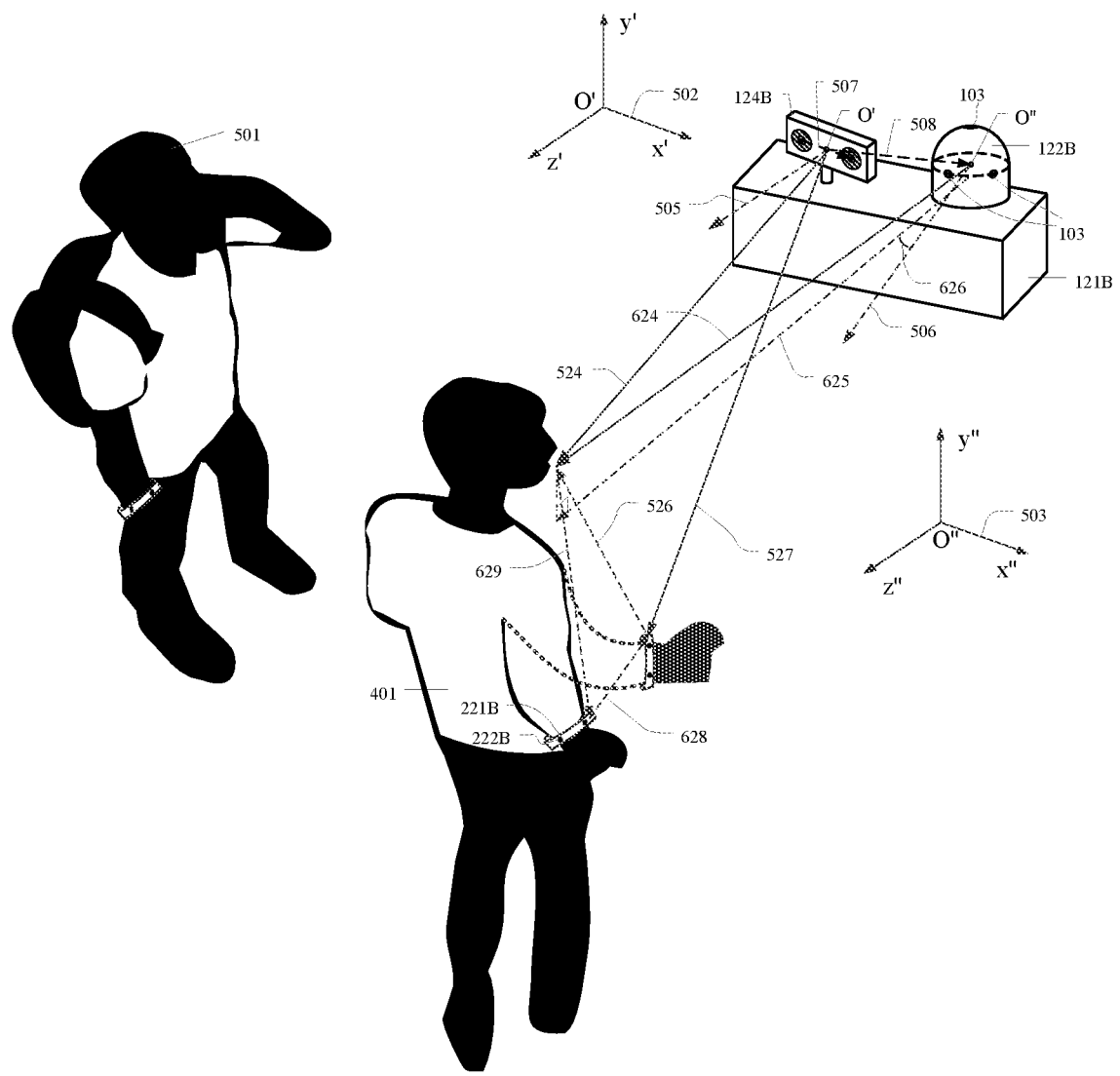
FIG. 5C is still another scene diagram illustrating the case that another acquisition equipment tracks acquisition objects in an embodiment of the present disclosure.

For instance, as shown in FIG. 5C, in still another example, the acquisition equipment 121B comprises an audio acquisition device 122B and an image acquisition device 124B.

For instance, as different from the example as shown in FIG. 5B, an acquisition object 221B in the example as shown in FIG. 5C may be a bracelet. The acquisition equipment 121B, the sound source and the like in the example as shown in FIG. 5C may be the same with those in the example as shown in FIG. 5B, so no further description will be given here.

For instance, in the example as shown in FIG. 5C, a signal processing device of the acquisition equipment 121B is configured to: determine camera reference position information of the acquisition object 221B in the camera coordinate system 502; determine second camera relative position information between the camera position information and the camera reference position information of the acquisition object 221B in the camera coordinate system 502; acquire third camera relative position information between the sound source and the camera reference position information; and determine first camera relative position information according to the third camera relative position information and the second camera relative position information.

For instance, the camera reference position information is relevant to the acquisition object 221B. For instance, the camera reference position information may be position information when the acquisition object 221B is at the most possible wearing position. The image reference position information may represent corresponding position information of the camera reference position information in the optical image. The description on the most possible wearing position may refer to the above relevant description, and no further description will be given here.

For instance, as shown in FIG. 5C, if the first user 401 raises his arm, an inertial measurement unit of the acquisition object 221B may acquire the motion trajectory of the acquisition object 221B and determine real-time position information of the acquisition object 221B relative to the camera reference position information, namely the second camera relative position information. The real-time position information of the acquisition object 221B may be camera position information of the acquisition object.

For instance, as shown in FIG. 5C, in the camera coordinate system 502, a vector 628 is a vector of the second camera relative position information and may be obtained by the detection of the inertial measurement unit of the acquisition object 221B. A vector 629 is a vector of the third camera relative position information and may be preset according to the body parameters of the first user 401 and the type of the acquisition object 221B. A vector 526 is a vector of the first camera relative position information and may be determined according to the vectors 628 and 629. A vector 527 is a camera position vector of the acquisition object 221B; and a vector 524 is a camera sound source position information of the sound source. In the audio acquisition coordinate system 503, a vector 624 represents an audio acquisition sound source position vector of the sound source and may be obtained by the transformation of the vector 524. The azimuth of the sound source may be the solid angle of the audio acquisition sound source position vector 624 in the audio acquisition coordinate system 503. A projection of the audio acquisition sound source position vector 624 of the sound source on the x"z" plane is a horizontal projection position vector 625 of the sound source. The seventh horizontal azimuth 626 may be an angle between the horizontal projection position vector 625 of the sound source and the normal direction 506 of the acquisition equipment 121B. The seventh horizontal azimuth 626 is the horizontal azimuth of the sound source. The fourth vertical azimuth (not shown) may be an angle between the audio acquisition sound source position vector 624 and the horizontal projection position vector 625 of the sound source. The fourth vertical azimuth is the vertical azimuth of the sound source, and the azimuth of the sound source may include the horizontal azimuth and/or the vertical azimuth of the sound source. For instance, in one example, the azimuth of the sound source may include the horizontal azimuth of the sound source, that is, the seventh horizontal azimuth 626 may be set to be one sound pick-up angle of the audio acquisition device 122B. But it is not limited thereto, and the azimuth of the sound source is a 3D stereo azimuth and may include the horizontal azimuth (for instance, the seventh horizontal azimuth 626) and the vertical azimuth (for instance, the fourth vertical azimuth) of the sound source.

It should be noted that in order to clearly and simply illustrate the technical proposals of the embodiments of the present disclosure, the description of the second user 501 is omitted in relevant description of the examples as shown in FIGS. 5B and 5C. But it should be known by those skilled in the art that the relevant description of the first user 401 may be applicable to the second user 501 without conflict.

FIGS. 4A-5C do not show the signal processing device, the angle control device, the first communicator and the first power supply disposed inside the acquisition equipment. FIGS. 4A-5C do not show the second power supply, the controller, the memory, the second communicator and the inertial measurement unit inside the acquisition object, either.

It should be noted that in the above description, in the examples as shown in FIGS. 4A to 4C, the position vector (including the camera position vector and the horizontal projection position vector) only includes azimuth information. In the examples as shown in FIGS. 5A-5C, the position vector (including the camera position vector, the horizontal projection position vector and the audio acquisition position vector) includes azimuth information and distance information.

Figure 6:
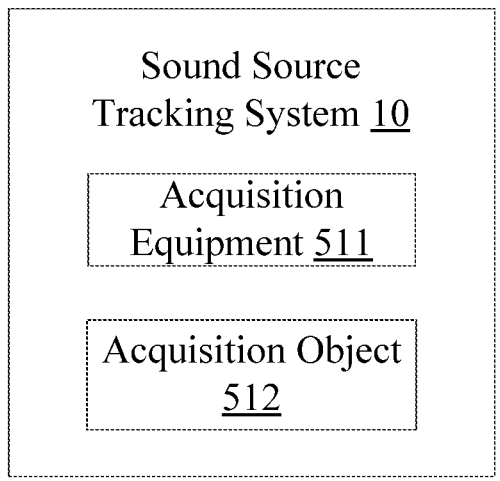
FIG. 6 is a schematic block diagram of a sound source tracking system provided by an embodiment of the present disclosure.

FIG. 6 is a schematic block diagram of a sound source tracking system provided by one embodiment of the present disclosure. As shown in FIG. 6, the sound source tracking system 10 comprises an acquisition object 512 and an acquisition equipment 511.

For instance, the acquisition object 512 may include an luminous element. When the acquisition object 512 is disposed in a tracking area of the acquisition equipment 511, the luminous element is configured to emit light.

For instance, the acquisition equipment 511 may include an audio acquisition device, an image acquisition device, an information processing device and an angle control device.

For instance, when the acquisition object 512 is disposed in the tracking area of the acquisition equipment 511, the image acquisition device of the acquisition equipment 511 is configured to acquire an optical image of the tracking area of the acquisition equipment 511. Thus, the optical image includes the acquisition object 512.

For instance, the audio acquisition device of the acquisition equipment 511 is configured to acquire the sound of a target object. The information processing device of the acquisition equipment 511 is configured to process the optical image including the acquisition object 512 so as to determine position information of the target object. The angle control device of the acquisition equipment 511 is also configured to control the sound pick-up angle of the audio acquisition device of the acquisition equipment 511 according to the position information of the target object so as to track the target object.

For instance, the information processing device of the acquisition equipment 511 may also establish a camera coordinate system based on the image acquisition device in the acquisition equipment 511. Thus, the coordinate value in the camera coordinate system may be utilized to represent position information of the image acquisition device in the acquisition equipment 511.

For instance, the acquisition object 512 may include an inertial measurement unit. The inertial measurement unit of the acquisition object 512 is configured to detect motion information of the acquisition object 512.

For instance, in one example, the acquisition object 512 may also include a controller. The controller of the acquisition object 512 is configured to: acquire type information of the acquisition object 512; acquire motion information of the acquisition object 512; and determine camera reference position information of the acquisition object 512 in the camera coordinate system or determine image reference position information of the acquisition object 512 in the optical image, according to the motion information of the acquisition object 512 and the type information of the acquisition object 512. For instance, the acquisition object 512 is a bracelet; the most possible wearing position is the wrist; and the most possible wearing state is the natural hanging of the arm. Thus, the camera reference position information may be position information when the bracelet is worn on the naturally hanging wrist, while the image reference position information is corresponding position information of the wearing position in the optical image when the bracelet is worn on the naturally hanging wrist.

For instance, in another example, the signal processing device of the acquisition equipment 511 is configured to: acquire type information of the acquisition object 512; acquire motion information of the acquisition object 512; and determine camera reference position information of the acquisition object 512 in the camera coordinate system or determine image reference position information of the acquisition object 512 in the optical image, according to the motion information of the acquisition object 512 and the type information of the acquisition object 512.

For instance, the type information of the acquisition object 512 may be stored in a memory of the acquisition object 512.

For instance, a sound source tracking system 10 may comprise a plurality of acquisition objects. The change modes of luminous parameters of luminous elements in the plurality of acquisition objects are different from each other.

It should be noted that the acquisition object 512 may be the acquisition object 201 in the above embodiment(s) of the acquisition equipment, and the acquisition equipment 511 may be the acquisition equipment 101 in the above embodiment(s). The schematic block diagram of the acquisition equipment 511 may refer to FIG. 1, and the schematic block diagram of the acquisition object 512 may refer to FIG. 2. The specific description of the acquisition object 512 and the acquisition equipment 511 may refer to relevant description in the above embodiment(s) of the acquisition equipment, so no further description will not be given here.

Figure 7:
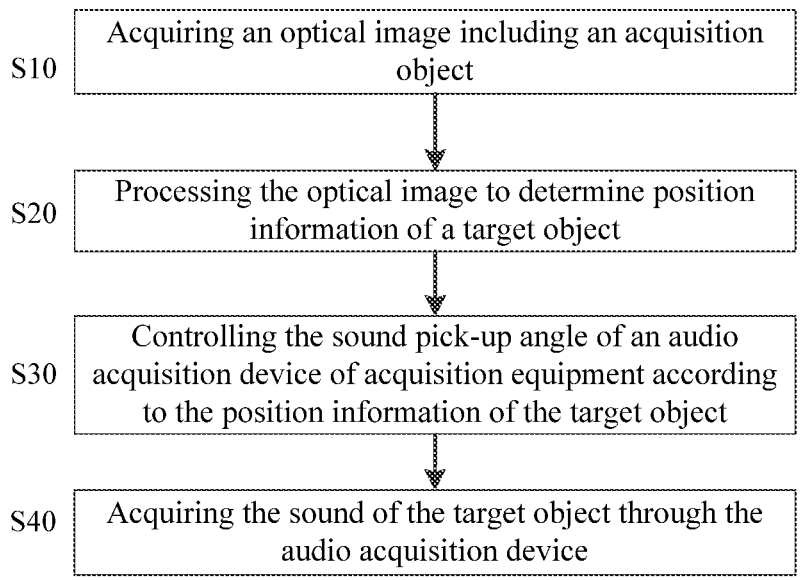
FIG. 7 is a flowchart of a sound acquisition method provided by the embodiment of the present disclosure.

FIG. 7 is a flowchart of a sound acquisition method provided by the embodiment of the present disclosure.

For instance, as shown in FIG. 7, the sound acquisition method provided by the embodiment of the present disclosure may comprise the following steps:

S10: acquiring an optical image including an acquisition object;

S20: processing the optical image to determine position information of a target object;

S30: controlling the sound pick-up angle of an audio acquisition device of acquisition equipment according to the position information of the target object; and S40: acquiring the sound of the target object through the audio acquisition device.

For instance, in the step S10, the acquisition equipment may include an image acquisition device, and the image acquisition device of the acquisition equipment is configured to acquire the optical image in a tracking area of the acquisition equipment. For instance, when the acquisition object is in the tracking area of the acquisition equipment, the image acquisition device of the acquisition equipment is configured to acquire the optical image of the tracking area of the acquisition equipment, so the optical image includes the acquisition object.

For instance, in one embodiment, the acquisition object may be a wearable device.

It should be noted that the specific description on the acquisition object and the acquisition equipment may refer to relevant description in the above embodiments of the acquisition equipment.

For instance, in one example, as shown in FIG. 4A, the signal processing device of the acquisition equipment 101A is configured to: establish a camera coordinate system 402 based on an audio acquisition device 102A and an image acquisition device 104A. Thus, the coordinate value of the camera coordinate system 402 (namely O-xyz coordinate system) can be utilized to represent position information of the image acquisition device 104A and position information of the audio acquisition device 102A. Projections of the center of the image acquisition device 104A and the center of the audio acquisition device 102A in the vertical direction coincide, that is, projections of a corresponding point of the center of the image acquisition device 104A in the camera coordinate system 402 and a corresponding point of the center of the audio acquisition device 102A in the camera coordinate system 402 on the xz plane coincide. In this case, the step S20 may include: determining image position information of the acquisition object in the optical image; and determining the horizontal azimuth of the acquisition object according to the image position information, in which the position information of the target object includes the horizontal azimuth of the acquisition object. The step S30 may include: controlling the sound pick-up angle of the audio acquisition device according to the horizontal azimuth of the acquisition object. For instance, the horizontal azimuth of the acquisition object may be the horizontal azimuth of the acquisition object in the camera coordinate system and may be set to be the sound pick-up angle of the audio acquisition device.

For instance, in another example, as shown in FIG. 5A, the step S20 may include: establishing a camera coordinate system 502 based on the image acquisition device 104B, and establishing an audio acquisition coordinate system 503 based on the audio acquisition device 102B. Thus, the coordinate value in the camera coordinate system 502 (namely O'-x'y'z' coordinate system) can be utilized to represent position information of the image acquisition device 104B, and the coordinate value in the audio acquisition coordinate system 503 (namely O"-x"y"z" coordinate system) can be utilized to represent position information of the audio acquisition device 102B. For instance, the step S20 may further include: determining camera position information of the acquisition object in the camera coordinate system; transforming the camera position information of the acquisition object into audio acquisition position information in the audio acquisition coordinate system; and determining the azimuth of the acquisition object in the audio acquisition coordinate system according to the audio acquisition position information, in which the position information of the target object includes the azimuth of the acquisition object. The step S30 may include: controlling the sound pick-up angle of the audio acquisition device according to the azimuth of the acquisition object. For instance, the azimuth of the acquisition object in the audio acquisition coordinate system may be set to be the sound pick-up angle of the audio acquisition device.

For instance, as shown in FIG. 5A, a projection of the audio acquisition position vector 604 of the acquisition object 201B on the x"z" plane is a horizontal projection position vector 605 of the acquisition object 201B. The second horizontal azimuth 606 may be an angle between the horizontal projection position vector 605 of the acquisition object 201B and the normal direction of the acquisition equipment 101B. The second horizontal azimuth 606 is the horizontal azimuth of the acquisition object 201B. The first vertical azimuth (not shown) may be an angle between the audio acquisition position vector 604 and the horizontal projection position vector 605 of the acquisition object 201B. The first vertical azimuth is the vertical azimuth of the acquisition object 201B. The azimuth of the acquisition object 201B may include the horizontal azimuth and/or the vertical azimuth of the acquisition object 201B.

For instance, in another embodiment, the target object may be a user and includes a sound source; the sound source is the mouth of the user; and the optical image includes the sound source.

For instance, in one example, the audio acquisition device and the image acquisition device are integrated into a whole, and projections of the center of the image acquisition device and the center of the audio acquisition device in the vertical direction are coincident. In this case, the step S20 may include: determining image position information of the acquisition object in the optical image; determining first image relative position information between the acquisition object and the sound source in the optical image; determining image position information of the sound source in the optical image according to the image position information of the acquisition object and the first image relative position information; and determining the horizontal azimuth of the sound source according to the image position information of the sound source, in which the position information of the target object includes the horizontal azimuth of the sound source. The step S30 may include: controlling the sound pick-up angle of the audio acquisition device according to the horizontal azimuth of the sound source. For instance, the horizontal azimuth of the sound source is the horizontal azimuth of the sound source in the camera coordinate system, and may be set to be the sound pick-up angle of the audio acquisition device.

For instance, as shown in FIG. 4B, the first image relative position information between the acquisition object 211A and the sound source does not change along with the motion of the first user 401. A vector 417 represents a vector of the first image relative position information on the optical image. A vector 413 represents a camera position vector of the acquisition object 211A and may be determined according to the image position information of the acquisition object 211A in the optical image. A vector 415 represents a camera sound source position vector of the sound source and may be determined according to the image position information of the sound source in the optical image. A vector 414 is a horizontal projection position vector of the sound source, namely a projection of the camera sound source position vector 415 of the sound source on the xz plane. The fourth horizontal azimuth 416 is an angle between the horizontal projection position vector 414 of the sound source and an optical axis direction 405 of the image acquisition device 114A, and represents the horizontal azimuth of the sound source in the camera coordinate system.

For instance, in another example, the audio acquisition device and the image acquisition device are integrated into a whole, and projections of the center of the image acquisition device and the center of the audio acquisition device in the vertical direction are coincident. In this case, the step S20 may include: determining image reference position information of the acquisition object in the optical image; determining second image relative position information between the image position information and the image reference position information of the acquisition object in the optical image; acquiring third image relative position information between the sound source and the image reference position information; determining first image relative position information according to the third image relative position information and the second image relative position information; determining image position information of the sound source in the optical image according to the image position information of the acquisition object and the first image relative position information; and determining the horizontal azimuth of the sound source according to the image position information of the sound source. For instance, the horizontal azimuth of the sound source may be the horizontal azimuth of the sound source in the camera coordinate system, and may be set to be the sound pick-up angle of the audio acquisition device.

For instance, as shown in FIG. 4C, the first image relative position information between the acquisition object 221A and the sound source may change along with the motion of the first user 401. On the optical image, a vector 428 is a vector of the second image relative position information; a vector 429 is a vector of the third image relative position information; and a vector 427 is a vector of the first image relative position information. In the camera coordinate system 402, a vector 423 is a camera position vector of the acquisition object 221A; a vector 425 is a camera sound source position vector of the sound source; and a vector 424 is a horizontal projection position vector of the sound source, namely a projection of the camera sound source position vector 425 of the sound source on the xz plane. The fifth horizontal azimuth 426 is an angle between the horizontal projection position vector 424 of the sound source and an optical axis direction 405 of the image acquisition device 124A, and represents the horizontal azimuth of the sound source in the camera coordinate system.

For instance, in still another example, the step S20 may include: establishing a camera coordinate system based on the image acquisition device, and establishing an audio acquisition coordinate system based on the audio acquisition device; determining camera position information of the acquisition object in the camera coordinate system; determining first camera relative position information between the acquisition object and the sound source in the camera coordinate system; determining camera sound source position information of the sound source in the camera coordinate system according to the camera position information of the acquisition object and the first camera relative position information; transforming the camera sound source position information into audio acquisition sound source position information in the audio acquisition coordinate system; and determining the azimuth of the sound source in the audio acquisition coordinate system according to the audio acquisition sound source position information, in which the position information of the target object includes the azimuth of the sound source. The step S30 may include: controlling the sound pick-up angle of the audio acquisition device according to the azimuth of the sound source. The azimuth of the sound source in the audio acquisition coordinate system may be set to be the sound pick-up angle of the audio acquisition device.

For instance, as shown in FIG. 5B, the first camera relative position information between the acquisition object 211B and the sound source does not change along with the motion of the first user 401. In the camera coordinate system 502, a vector 514 represents a camera position vector of the acquisition object 211B; a vector 516 represents a vector of the first camera relative position information; and a vector 517 represents a camera sound source position vector of the sound source. In the audio acquisition coordinate system 503, a vector 614 represents an audio acquisition sound source position vector of the sound source. A projection of the audio acquisition sound source position vector 614 of the sound source on the x"z" plane is a horizontal projection position vector 615 of the sound source. The sixth horizontal azimuth 616 may be an angle between the horizontal projection position vector 615 of the sound source and the normal direction 506 of the acquisition equipment 111B, and is the horizontal azimuth of the acquisition object 211B. The third vertical azimuth (not shown) may be an angle between the audio acquisition sound source position vector 614 of the sound source and the horizontal projection position vector 615. The third vertical azimuth is the vertical azimuth of the acquisition object 211B. The azimuth of the acquisition object 211B may include the horizontal azimuth and/or the vertical azimuth of the acquisition object 211B.

For instance, in still another example, the step S20 may include: establishing a camera coordinate system based on the image acquisition device, and establishing an audio acquisition coordinate system based on the audio acquisition device; determining camera reference position information of the acquisition object in the camera coordinate system; determining second camera relative position information between the camera position information and the camera reference position information of the acquisition object in the camera coordinate system; acquiring third camera relative position information between the sound source and the camera reference position information; determining first camera relative position information according to the third camera relative position information and the second camera relative position information; determining camera sound source position information of the sound source in the camera coordinate system according to the camera position information of the acquisition object and the first camera relative position information; transforming the camera sound source position information into audio acquisition sound source position information in the audio acquisition coordinate system; and determining the azimuth of the sound source in the audio acquisition coordinate system according to the audio acquisition sound source position information. The step S30 may include: controlling the sound pick-up angle of the audio acquisition device according to the azimuth of the sound source. The azimuth of the sound source in the audio acquisition coordinate system may be set to be the sound pick-up angle of the audio acquisition device.

For instance, as shown in FIG. 5C, the first camera relative position information between the acquisition object 221B and the sound source may change along with the motion of the first user 401. In the camera coordinate system 502, a vector 628 is a vector of the second camera relative position information; a vector 629 is a vector of the third camera relative position information; a vector 526 is a vector of the first camera relative position information; a vector 527 is a camera position vector of the acquisition object 221B; and a vector 524 is a camera sound source position vector of the sound source. In the audio acquisition coordinate system 503, a vector 624 represents an audio acquisition sound source position vector of the sound source. A projection of the audio acquisition sound source position vector 624 of the sound source on the x"z" plane is a horizontal projection position vector 625 of the sound source. The seventh horizontal azimuth 626 may be an angle between the horizontal projection position vector 625 of the sound source and the normal direction 506 of the acquisition equipment 121B, and is the horizontal azimuth of the acquisition object 221B. The fourth vertical azimuth (not shown) may be an angle between the audio acquisition sound source position vector 624 and the horizontal projection position vector 625 of the sound source. The fourth vertical azimuth is the vertical azimuth of the acquisition object 221B. The azimuth of the acquisition object 221B may include the horizontal azimuth and/or the vertical azimuth of the acquisition object 221B.

It should be noted that the specific description on the sound acquisition method may refer to relevant description of the examples as shown in FIGS. 4A to 5C in the embodiment of the acquisition equipment, so no further description will be given here.

Figure 8:
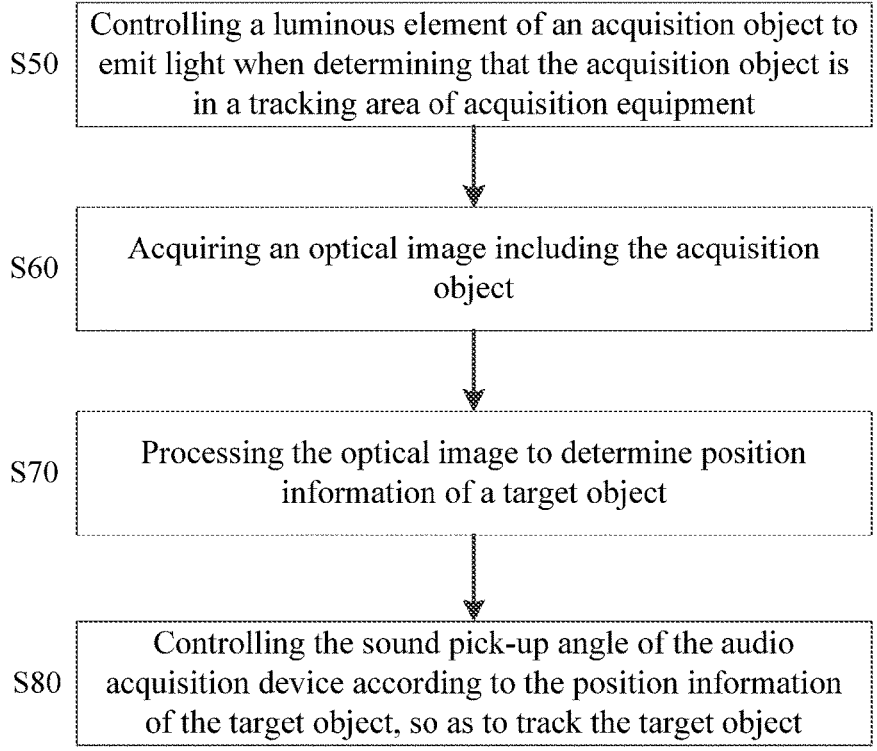
FIG. 8 is an overall flowchart of a sound source tracking method provided by the embodiment of the present disclosure.
Figure 9:
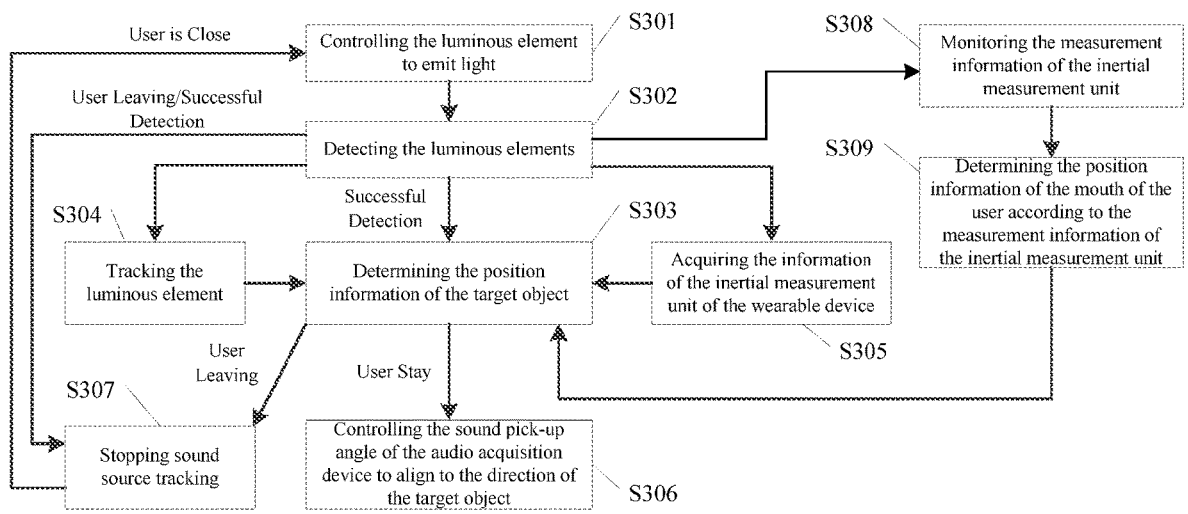
FIG. 9 is a schematic flowchart of the sound source tracking method provided by the embodiment of the present disclosure.

FIG. 8 is an overall flowchart of a sound source tracking method provided by the embodiment of the present disclosure. FIG. 9 is a schematic flowchart of the sound source tracking method provided by the embodiment of the present disclosure.

For instance, as shown in FIG. 8, the sound source tracking method provided by the embodiment of the present disclosure may comprise the following steps:

S50: controlling a luminous element of an acquisition object to emit light when determining that the acquisition object is in a tracking area of acquisition equipment;

S60: acquiring an optical image including the acquisition object;

S70: processing the optical image to determine position information of a target object; and S80: controlling the sound pick-up angle of the audio acquisition device according to the position information of the target object, so as to track the target object.

For instance, in the step S50, whether the acquisition object is close to or away from the tracking area of the acquisition equipment may be determined according to the case that a first communicator of the acquisition object and a second communicator of the acquisition equipment enter and leave respective communication range, and may also be determined according to the case that the acquisition object enters or leaves a shooting area of an image acquisition device of the acquisition equipment.

For instance, in the step S60, the acquisition equipment includes the image acquisition device, and the image acquisition device of the acquisition equipment is configured to acquire the optical image. The optical image is an image in the tracking area of the acquisition equipment.

It should be noted that the processing processes of the steps S70 and S80 may refer to relevant description of the examples as shown in FIGS. 4A-5C in the embodiment of the acquisition equipment.

For instance, the acquisition object may be a wearable device. The target object may be a user and includes a sound source.

For instance, the acquisition equipment may include an audio acquisition device, an image acquisition device, a signal processing device and an angle control device.

Detailed description will be given below to the sound source tracking method by taking the case that the acquisition object is a wearable device, the target object being a user, the wearable device being worn on the user, as an example. For instance, as shown in FIG. 9, when the user is close to the acquisition equipment and enters the tracking area of the acquisition equipment, the step S301 is executed: controlling the luminous elements to emit light; and subsequently, the step S302 is executed: detecting the luminous elements. In the step S301, when the user enters the tracking area of the acquisition equipment, a controller of the wearable device may control the luminous elements to emit light. In the step S302, the image acquisition device of the acquisition equipment is configured to acquire the optical image in the tracking area, and the signal processing device of the acquisition equipment may process the acquired optical image so as to detect whether there is any luminous element in the optical image.

For instance, when the detection fails and no luminous element is detected, the image acquisition device continuously acquires the optical image of the tracking area.

For instance, when no luminous element is detected and the user leaves the tracking area, the image acquisition device stops acquiring the optical image of the tracking area, namely the step S307 is executed: stopping sound source tracking.

For instance, in the case of successful detection, namely when the luminous element is detected, the step S303 may be executed: determining the position information of the target object. For instance, in some embodiments, the position information of the target object may include the position information of the acquisition object. In the step S303, the signal processing device may process the optical image including the luminous element so as to determine the position information of the acquisition object. The specific operation process of determining the position information of the acquisition object may refer to relevant description in the embodiment(s) of the acquisition equipment.

For instance, when the luminous element is detected, the step S304 may also be executed: tracking the luminous element. In the step S304, the angle control device may control the image acquisition device to track the luminous element. For instance, in the step S304, on one hand, the signal processing device may detect the position of the luminous element in the optical image in real time; and on the other hand, the angle control device may control the image acquisition device to perform one or more operations such as rotation, zooming and focusing, so as to control the image acquisition device to track the luminous element.

For instance, in one example, when the luminous element is detected, the step S305 may also be executed: acquiring information of the inertial measurement unit of the wearable device. In the step S305, the signal processing device may also control the first communicator to acquire measurement information of the inertial measurement unit from the wearable device. The signal processing device may also process the measurement information of the inertial measurement unit so as to determine the position information of the mouth (namely the sound source) of the user, and the position information of the target object may also include the position information of the mouth of the user.

For instance, in the step S305, gesture information and position information of the wearable device may be determined according to the acceleration and the angular velocity measured by the inertial measurement unit and/or magnetic field information. The position information must be determined through the gesture information.

For instance, in another example, when the luminous element is detected, the steps S308 and S309 may also be executed. The step S308 includes monitoring the measurement information of the inertial measurement unit. The step S309 includes determining the position information of the mouth of the user according to the measurement information of the inertial measurement unit. The functions of the steps S308 and S309 may be realized through the controller of the wearable device. That is, in the step S308, the controller is adopted to read the measurement information of the inertial measurement unit in real time; and in the step S309, the position information of the mouth of the user is determined by adoption of the controller to process the measurement information of the inertial measurement unit.

For instance, in the step S308, the inertial measurement unit may be always in the working state. That is, before the wearable device enters the tracking area of the acquisition equipment, starting from the power application of the wearable device, the inertial measurement unit begins to detect the motion information of the wearable device. Thus, the inertial measurement unit may monitor the wearable device for a long time, and the monitoring time is generally greater than 0.5 h. Corresponding point of an actual wearing position in the motion and gesture trajectories of the wearable device can be determined according to the monitoring result of the inertial measurement unit.

For instance, if the actual wearing position of the wearable device is the same with the most possible wearing position, the step S309 may include: acquiring the device type of the wearable device and the most possible wearing position; acquiring user information; and determining the position information of the mouth (namely the sound source) of the user according to the most possible wearing position of the wearable device, the motion and gesture trajectories of the wearable device, and the user information. If the actual wearing position of the wearable device is different from the most possible wearing position, the step S309 may include: acquiring the actual wearing position of the wearable device; acquiring user information; and determining the position information of the mouth of the user according to the actual wearing position of the wearable device, the motion and gesture trajectories of the wearable device, and the user information.

For instance, reference position information of the wearable device may be determined according to the most possible wearing position of the wearable device. The reference position information of the wearable device may include camera reference position information and image reference position information. The camera reference position information may be position information when the wearable device is at the most possible wearing position, while the image reference position information may be corresponding position information of the most possible wearing position in the optical image when the wearable device is at the most possible wearing position.

For instance, the sound source tracking method further comprises: detecting motion information of the acquisition object (for instance, the wearable device) through the inertial measurement unit; acquiring type information of the acquisition object; and determining the camera reference position information of the acquisition object in the camera coordinate system or determining the image reference position information of the acquisition object in the optical image, according to the motion information of the acquisition object and the type information of the acquisition object.

For instance, the device type and the most possible wearing position of the wearable device may be stored in a memory of the wearable device.

For instance, the user may input the user information when wearing the wearable device. The user information includes but not limited to body parameters of the user, the actual wearing position of the wearable device, etc.

It should be noted that the specific operation process of determining the position information of the mouth (namely the sound source) of the user may refer to relevant description in the embodiment(s) of the acquisition equipment.

For instance, the information acquired in the steps S304, S305 and S309 may be used in the step S303, so that the acquired position information of the acquisition object can be more accurate.

For instance, when detecting that the user is staying in the tracking area of the acquisition equipment, the step S306 is executed: controlling the sound pick-up angle of the audio acquisition device to align to the direction of the target object. In the step S306, the angle control device may be adopted to control the sound pick-up angle of the audio acquisition device to align to the direction of the target object.

For instance, when the user is staying in the tracking area of the acquisition equipment, the steps S303 and S306 may be subjected to mutual promotion and iteration. On one hand, the position information of the luminous element acquired by the image acquisition device may be used for determining the sound pick-up angle of the audio acquisition device. On the other hand, the positioning information of the audio acquisition device on the sound source may be used for determining the position information of the luminous element in the optical image acquired by the image acquisition device.

For instance, when detecting that the user leaves the tracking area of the acquisition equipment, the step S307 is executed: stopping sound source tracking. In the step S307, when detecting that the user is close to the acquisition equipment and enters the tracking area of the acquisition equipment, the step S301 is executed again.

For the disclosure, the following points should be noted:

(1) Only the structures relevant to the embodiments of the present disclosure are involved in the accompanying drawings of the embodiments of the present invention, and other structures may refer to the prior art.

(2) The embodiments of the present disclosure and the features in the embodiments may be mutually combined without conflict.

The foregoing is merely exemplary embodiments of the disclosure, but is not used to limit the protection scope of the invention. The protection scope of the invention shall be defined by the attached claims.

The invention claimed is:

1. An acquisition equipment, comprising:
an audio acquisition device, an image acquisition device, an information processing device and an angle control device, wherein
the audio acquisition device is configured to acquire sound of a target object;
the image acquisition device is configured to acquire an optical image including an acquisition object;
the information processing device is configured to process the optical image to determine position information of the target object; and
the angle control device is configured to receive the position information of the target object sent by the information processing device, and control a sound pick-up angle of the audio acquisition device according to the position information of the target object,
wherein the target object includes a sound source; the image acquisition device and the audio acquisition device are integrated into a whole;
the information processing device is further configured to determine image position information of the acquisition object in the optical image, determine first image relative position information between the acquisition object and the sound source, and determine a horizontal azimuth of the sound source according to the image position information of the acquisition object and the first image relative position information, in which the position information of the target object includes the horizontal azimuth of the sound source; and
the angle control device is further configured to receive the horizontal azimuth of the sound source and control the sound pick-up angle of the audio acquisition device according to the horizontal azimuth of the sound source.

2. The acquisition equipment according to claim 1, wherein the information processing device is further configured to determine image reference position information of the acquisition object in the optical image, determine second image relative position information between the image position information and the image reference position information of the acquisition object in the optical image, acquire third image relative position information between the sound source and the image reference position information, and determine the first image relative position information according to the third image relative position information and the second image relative position information.

3. A sound source tracking system, comprising: the acquisition object and the acquisition equipment according to claim 1, the acquisition object including a luminous element, wherein
the luminous element is configured to emit light when the acquisition object is in a tracking area of the acquisition equipment; and
the angle control device of the acquisition equipment is further configured to control the sound pick-up angle of the audio acquisition device according to the position information of the target object so as to track the target object.

4. The sound source tracking system according to claim 3, wherein the image acquisition device is configured to acquire the optical image of the tracking area of the acquisition equipment when the acquisition object is in the tracking area of the acquisition equipment.

5. The sound source tracking system according to claim 3, wherein the acquisition object further includes a controller and an inertial measurement unit;
the inertial measurement unit is configured to detect motion information of the acquisition object; and
the controller or the information processing device is configured to establish a camera coordinate system based on the image acquisition device, acquire type information of the acquisition object, acquire the motion information of the acquisition object, and determine camera reference position information of the acquisition object in the camera coordinate system or determine image reference position information of the acquisition object in the optical image according to the motion information of the acquisition object and the type information of the acquisition object.

6. The sound source tracking system according to claim 3, comprising a plurality of acquisition objects; and luminous parameters of the luminous elements in the plurality of acquisition objects have different change modes.

7. An acquisition equipment, comprising:
an audio acquisition device, an image acquisition device, an information processing device and an angle control device, wherein
the audio acquisition device is configured to acquire sound of a target object;
the image acquisition device is configured to acquire an optical image including an acquisition object;
the information processing device is configured to process the optical image to determine position information of the target object; and
the angle control device is configured to receive the position information of the target object sent by the information processing device, and control a sound pick-up angle of the audio acquisition device according to the position information of the target object,
wherein the target object includes a sound source;
the information processing device is further configured to establish a camera coordinate system based on the image acquisition device, establish an audio acquisition coordinate system based on the audio acquisition device, determine camera position information of the acquisition object in the camera coordinate system, determine first camera relative position information between the acquisition object and the sound source in the camera coordinate system, determine camera sound source position information of the sound source in the camera coordinate system according to the camera position information of the acquisition object and the first camera relative position information, transform the camera sound source position information into audio acquisition sound source position information in the audio acquisition coordinate system, and determine an azimuth of the sound source in the audio acquisition coordinate system according to the audio acquisition sound source position information, in which the position information of the target object includes the azimuth of the sound source; and
the angle control device is further configured to receive the azimuth of the sound source and control the sound pick-up angle of the audio acquisition device according to the azimuth of the sound source.

8. The acquisition equipment according to claim 7, wherein the information processing device is further configured to determine camera reference position information of the acquisition object in the camera coordinate system, determine second camera relative position information between the camera position information and the camera reference position information of the acquisition object in the camera coordinate system, acquire third camera relative position information between the sound source and the camera reference position information, and determine first camera relative position information according to the third camera relative position information and the second camera relative position information.

9. A sound acquisition method, comprising:
acquiring an optical image of an acquisition object;
processing the optical image to determine position information of a target object;
controlling a sound pick-up angle of an audio acquisition device of an acquisition equipment according to the position information of the target object; and
acquiring sound of the target object through the audio acquisition device,
wherein the acquisition equipment further includes an image acquisition device, the image acquisition device is configured to acquire the optical image, the target object includes a sound source, the image acquisition device and the audio acquisition device are integrated into a whole;
processing the optical image to determine the position information of the target object includes: determine an image position information of the acquisition object in the optical image, determine first image relative position information between the acquisition object and the sound source in the optical image, and determine a horizontal azimuth of the sound source according to the image position information of the acquisition object and the first image relative position information, in which the position information of the target object includes the horizontal azimuth of the sound source; and
controlling the sound pick-up angle of the audio acquisition device of the acquisition equipment according to the position information of the target object includes: controlling the sound pick-up angle of the audio acquisition device according to the horizontal azimuth of the sound source.

10. The sound acquisition method according to claim 9, wherein determining the first image relative position information between the acquisition object and the sound source in the optical image includes:
determining image reference position information of the acquisition object in the optical image;
determining second image relative position information between the image position information and the image reference position information of the acquisition object in the optical image;
acquiring third image relative position information between the sound source and the image reference position information; and
determining the first image relative position information according to the third image relative position information and the second image relative position information.

11. A sound acquisition method, comprising:
acquiring an optical image of an acquisition object;
processing the optical image to determine position information of a target object;
controlling a sound pick-up angle of an audio acquisition device of an acquisition equipment according to the position information of the target object; and
acquiring sound of the target object through the audio acquisition device,
wherein the acquisition equipment further includes an image acquisition device, the image acquisition device is configured to acquire the optical image, the target object includes a sound source;
processing the optical image to determine the position information of the target object includes establishing a camera coordinate system based on the image acquisition device, establishing an audio acquisition coordinate system based on the audio acquisition device, determining camera position information of the acquisition object in the camera coordinate system, determining first camera relative position information between the acquisition object and the sound source in the camera coordinate system, determining camera sound source position information of the sound source in the camera coordinate system according to the camera position information of the acquisition object and the first camera relative position information, transforming the camera sound source position information into audio acquisition sound source position information in the audio acquisition coordinate system, and determining an azimuth of the sound source in the audio acquisition coordinate system according to the audio acquisition sound source position information, in which the position information of the target object includes the azimuth of the sound source; and controlling the sound pick-up angle of the audio acquisition device of the acquisition equipment according to the position information of the target object includes: controlling the sound pick-up angle of the audio acquisition device according to the azimuth of the sound source.

12. The sound acquisition method according to claim 11, wherein determining the first camera relative position information between the acquisition object and the sound source in the camera coordinate system includes:

determining camera reference position information of the acquisition object in the camera coordinate system;

determining second camera relative position information between the camera position information and the camera reference position information of the acquisition object in the camera coordinate system;

acquiring third camera relative position information between the sound source and the camera reference position information; and determining the first camera relative position information according to the third camera relative position information and the second camera relative position information.

13. A sound source tracking method, comprising:

controlling a luminous element of an acquisition object to emit light when determining that the acquisition object is in a tracking area of an acquisition equipment;

acquiring an optical image including the acquisition object;

processing the optical image to determine position information of a target object; and controlling a sound pick-up angle of the audio acquisition device of the acquisition equipment according to the position information of the target object so as to track the target object, wherein the acquisition equipment includes an image acquisition device; the image acquisition device is configured to acquire the optical image; the acquisition object further includes an inertial measurement unit;

the sound source tracking method further comprises:

establish a camera coordinate system based on the image acquisition device;

detecting motion information of the acquisition object through the inertial measurement unit;

acquiring type information of the acquisition object; and determining camera reference position information of the acquisition object in the camera coordinate system or determining image reference position information of the acquisition object in the optical image, according to the motion information of the acquisition object and the type information of the acquisition object.

* * * * *